(12) United States Patent
Honjo

(10) Patent No.: US 11,778,313 B2
(45) Date of Patent: Oct. 3, 2023

(54) IMAGE CAPTURING APPARATUS, DEVICE, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Tomoya Honjo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/214,170

(22) Filed: Mar. 26, 2021

(65) Prior Publication Data
US 2021/0306548 A1 Sep. 30, 2021

(30) Foreign Application Priority Data
Mar. 30, 2020 (JP) ................. 2020-061111

(51) Int. Cl.
*H04N 23/663* (2023.01)
*H04N 23/80* (2023.01)
*H04N 23/617* (2023.01)
*H04N 23/661* (2023.01)

(52) U.S. Cl.
CPC ......... *H04N 23/663* (2023.01); *H04N 23/617* (2023.01); *H04N 23/661* (2023.01); *H04N 23/80* (2023.01)

(58) Field of Classification Search
None
See application file for complete search history.

(56) References Cited

U.S. PATENT DOCUMENTS

2010/0115200 A1* 5/2010 Papagrigoriou ...... G06F 3/0607
711/E12.001
2012/0030398 A1* 2/2012 Zer ...................... G06F 13/28
710/308

(Continued)

FOREIGN PATENT DOCUMENTS

JP 2003-022427 A 1/2003
JP 2003-196613 A 7/2003

OTHER PUBLICATIONS

A European Search Report dated Aug. 12, 2021, that issued in the corresponding European Patent Application No. 21161689.1.

(Continued)

*Primary Examiner* — Quan Pham
(74) *Attorney, Agent, or Firm* — Cowan, Liebowitz & Latman, P.C.

(57) ABSTRACT

An image capturing apparatus, which includes a mounting part capable of attaching/detaching a device capable of holding at least an image captured by the image capturing apparatus and capable of communicating with the mounted device in accordance with a predetermined standard, obtains, from the device, information of communication specifications used to perform predetermined communication, in accordance with the predetermined standard, with the device mounted in the mounting part, and performs, using the obtained information of the communication specifications, the predetermined communication with the device mounted in the mounting part in accordance with the predetermined standard.

24 Claims, 22 Drawing Sheets

(56) References Cited

U.S. PATENT DOCUMENTS

| | | | |
|---|---|---|---|
| 2012/0147221 A1* | 6/2012 | Hasegawa | H04N 5/765 348/E7.085 |
| 2012/0254796 A1 | 10/2012 | Tan | |
| 2020/0073796 A1 | 3/2020 | Katsumata | |

OTHER PUBLICATIONS

J. Redmon, A. Farhadi "YOLO9000: Better Faster Stronger" Computer Vision and Pattern Recognition (CVPR) 2016 Cited in Specification in paragraphs [0050].

\* cited by examiner

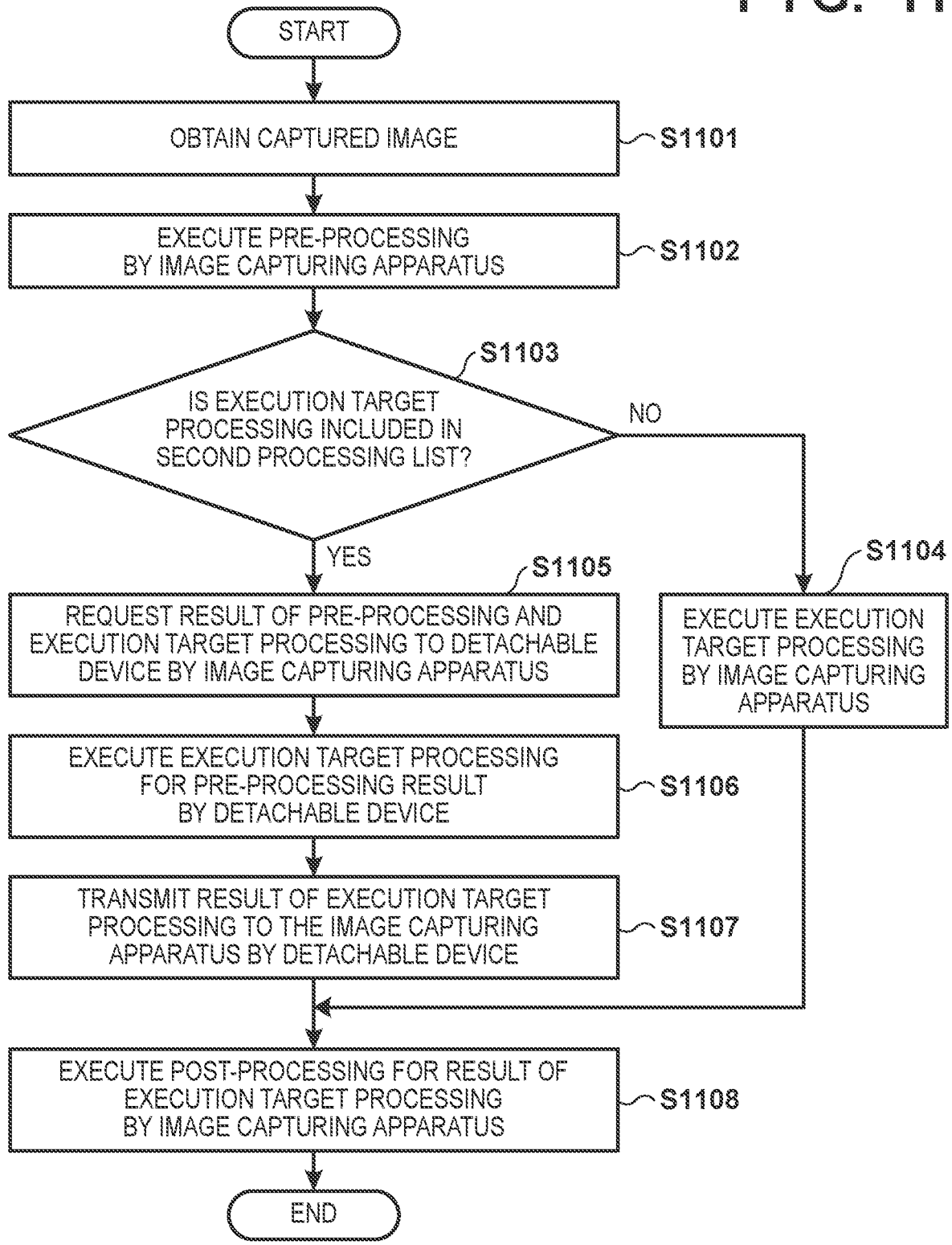

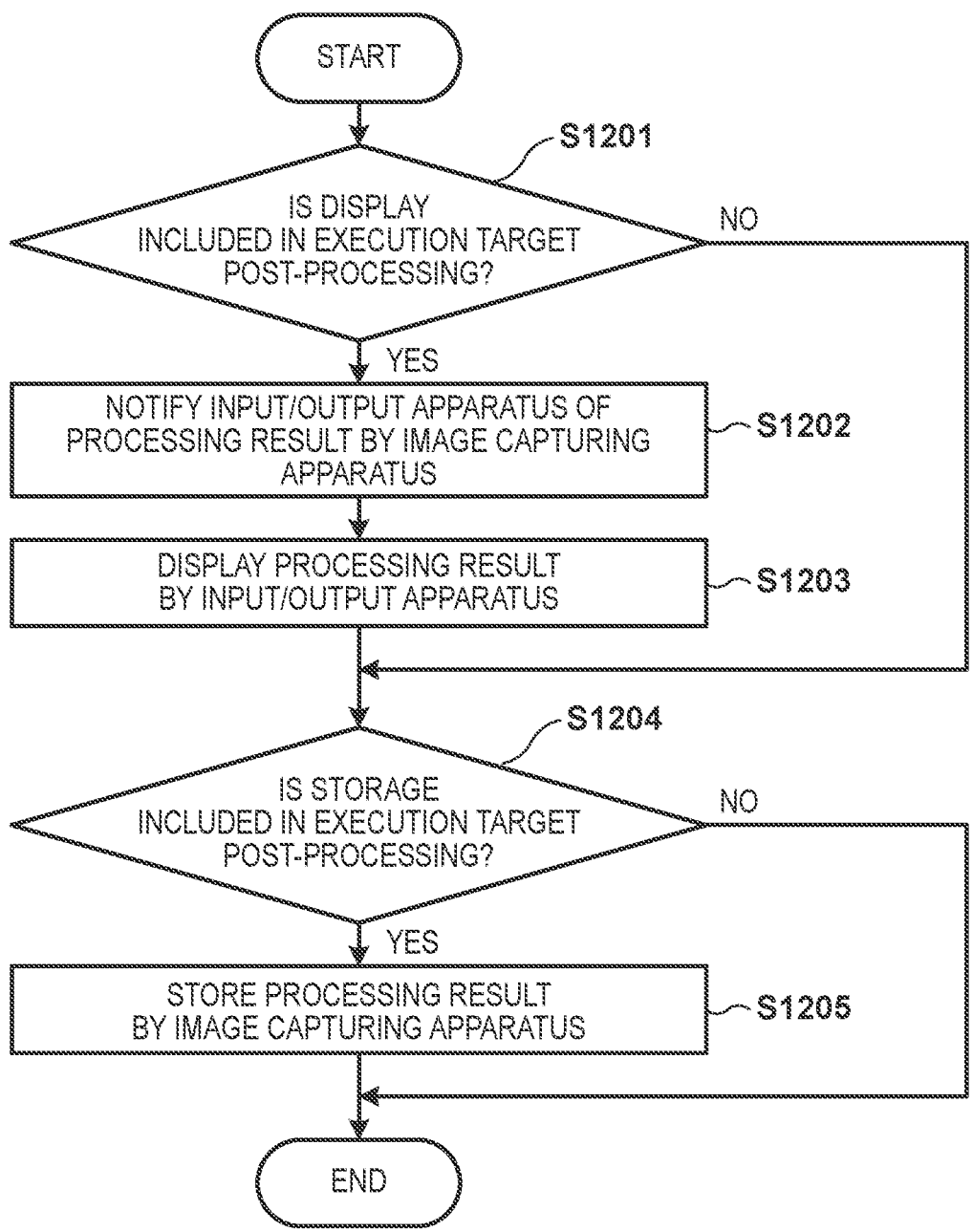

FIG. 15

| PROCESSING CLASSIFICATION | INPUT SIZE | INPUT DATA COUNT | ESTIMATED PROCESSING TIME | PROCESSING RESULT DATA COUNT | ANALYSIS RESULT STORAGE ADDRESS |
|---|---|---|---|---|---|
| ANALYSIS PROCESSING A | 64 x 64 | 20 BLOCK | 100 ns | 16 BLOCK | 0xFFFFFFFF |
| ANALYSIS PROCESSING B | 32 x 32 | 30 BLOCK | 512 ns | 32 BLOCK | 0xEEEEEEEE |
| ANALYSIS PROCESSING C | 16 x 16 | 40 BLOCK | 100 μs | 48 BLOCK | 0xAAAAAAAA |
| ANALYSIS PROCESSING D | 8 x 8 | 80 BLOCK | 4 ms | 64 BLOCK | 0xBBBBBBBB |
| ... | ... | ... | ... | ... | ... |

FIG. 26

| PROCESSING CONTENTS | NUMBER OF COMMANDS | 1 | | 2 | | ... |
|---|---|---|---|---|---|---|
| | | COMMAND NUMBER | COMMAND ARGUMENT | COMMAND NUMBER | COMMAND ARGUMENT | |
| IMAGE ANALYSIS PROCESSING EXECUTION | 1 | 23 | A | — | — | ... |
| PROCESSING FUNCTION SELECTION | 2 | 39 | B | 31 | addr | ... |
| ... | ... | ... | ... | ... | ... | ... |

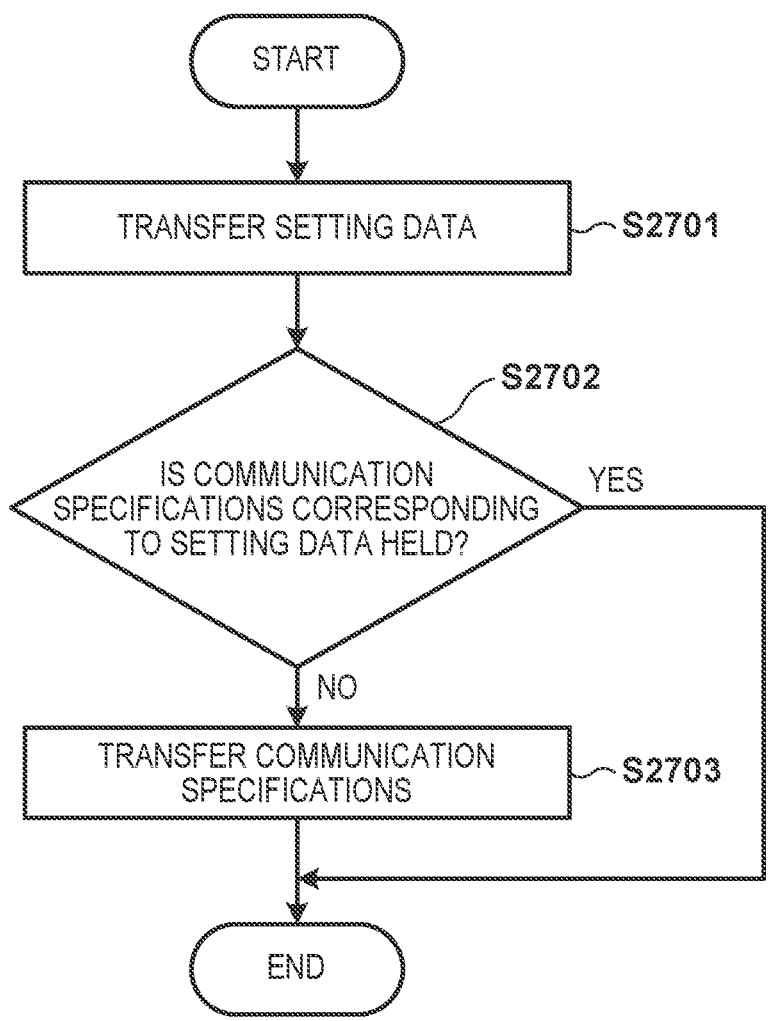

IMAGE CAPTURING APPARATUS, DEVICE, COMMUNICATION METHOD, AND NON-TRANSITORY COMPUTER-READABLE STORAGE MEDIUM

BACKGROUND OF THE INVENTION

Field of the Invention

The present invention relates to a communication technique of an apparatus.

Description of the Related Art

In recent years, image processing such as image analysis of performing object detection and tracking or performing attribute estimation, and estimation of the number of objects based on the result of such image analysis is performed in various scenes using images captured by a monitoring camera. Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by, for example, an arithmetic apparatus arranged in a camera main body. When the arithmetic apparatus is arranged in a detachable device such as a USB, the detachable device can execute at least a part of processing.

To cause the detachable device to execute processing, the camera performs necessary communication with the detachable device. At this time, the communication between the camera and the detachable device can be performed in accordance with a predetermined standard. However, communication specifications may change due to, for example, updating of the firmware of the detachable device, definition of new commands, and the like. If such a change of communication specifications has occurred, both the camera and the detachable device need to cope with the changed communication specifications. Japanese Patent Laid-Open No. 2003-022427 describes a technique in which a host apparatus reads out a driver suitable for an inserted detachable device from the detachable device based on driver information, thereby coping with a specification change and function expansion of the detachable device.

The technique of Japanese Patent Laid-Open No. 2003-022427 is cumbersome because it needs software updating on the host side.

The present invention provides a method of easily executing communication using a new communication function with a detachable device.

SUMMARY OF THE INVENTION

According to one aspect of the present invention, there is provided an image capturing apparatus comprising: a mounting part capable of attaching/detaching a device capable of holding at least an image captured by the image capturing apparatus and capable of communicating with the mounted device in accordance with a predetermined standard; an obtaining unit configured to obtain, from the device, information of communication specifications used to perform predetermined communication, in accordance with the predetermined standard, with the device mounted in the mounting part; and a communication unit configured to perform, using the obtained information of the communication specifications, the predetermined communication with the device mounted in the mounting part in accordance with the predetermined standard.

According to another aspect of the present invention, there is provided a device mounted in a mounting part of an image capturing apparatus including the mounting part capable of attaching/detaching a device capable of holding at least an image captured by the image capturing apparatus and capable of communicating with the mounted device in accordance with a predetermined standard, comprising: a providing unit configured to provide, to the image capturing apparatus, information of communication specifications used to perform predetermined communication with the image capturing apparatus in accordance with the predetermined standard; and a communication unit configured to perform, using the provided information of the communication specifications, the predetermined communication with the image capturing apparatus in accordance with the predetermined standard.

Further features of the present invention will become apparent from the following description of exemplary embodiments (with reference to the attached drawings).

BRIEF DESCRIPTION OF THE DRAWINGS

FIG. 11 is a flowchart showing an example of the procedure of control of executing analysis processing;

FIG. 12 is a flowchart showing an example of the procedure of control of executing post-processing;

FIG. 15 is a view showing an example of information that the image capturing apparatus obtains;

FIG. 26 is a view showing an example of the information of communication specifications; and FIG. 27 is a flowchart showing the procedure of processing of registering the information of communication specifications in the detachable device.

DESCRIPTION OF THE EMBODIMENTS

Figure 1:
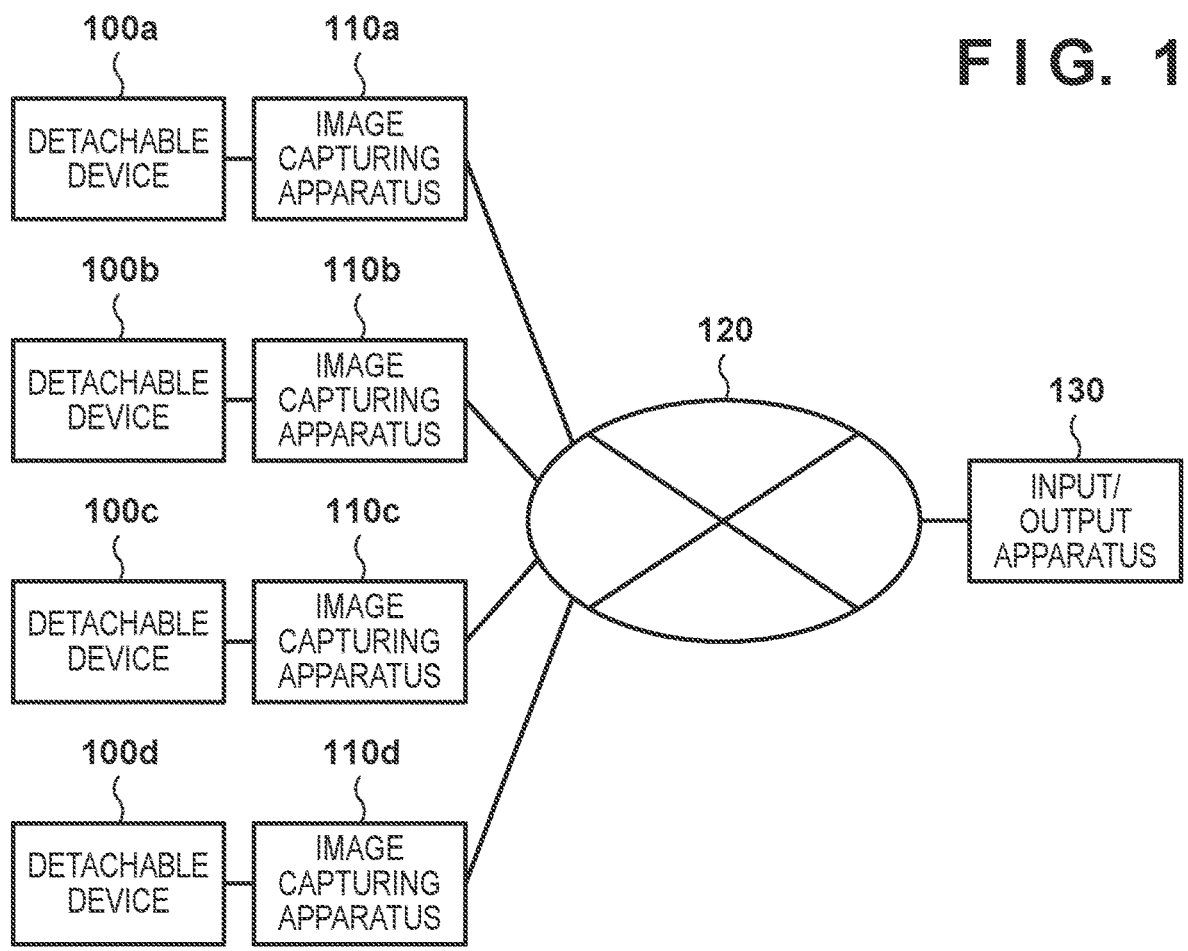
FIG. 1 is a block diagram showing an example of a system arrangement.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<System Arrangement>

FIG. 1 shows an example of the arrangement of an image analysis system according to this embodiment. As an example, a case in which this system is a specific person tracking system will be described below. However, the present invention is not limited to this, and the following argument can be applied to an arbitrary system for analyzing an image and performing predetermined information output. This system is configured to include image capturing apparatuses 110a to 110d, a network 120, and an input/output apparatus 130. Note that the image capturing apparatuses 110a to 110d each include a slot to/from which a device capable of recording, for example, a captured image can be attached/detached, and when the detachable devices 100a to 100d are inserted into the slots, the image capturing apparatuses 110a to 110d are connected to the detachable devices 100a to 100d. Note that the detachable devices 100a to 100d will be referred to as "detachable devices 100", and the image capturing apparatuses 110a to 110d will be referred to as "image capturing apparatuses 110" hereinafter.

The detachable device 100 is an arithmetic device attachable/detachable to/from the image capturing apparatus 110. As an example, the detachable device 100 is a device with a predetermined processing circuit mounted in an SD card. The detachable device 100 is configured to be inserted as a whole into the image capturing apparatus 110 in a form of, for example, an SD card, and can therefore be configured to be connectable to the image capturing apparatus 110 without making any portion project from the image capturing apparatus 110. Alternatively, the detachable device 100 may be configured such that, for example, a half or more of it can be inserted into the image capturing apparatus 110, and may therefore be configured to be connectable to the image capturing apparatus 110 while making a portion project a little from the image capturing apparatus 110. This can prevent the detachable device 100 from interfering with an obstacle such as a wiring and raise the convenience when using the device. In addition, since an SD card slot is prepared in a lot of existing image capturing apparatuses 110 such as a network camera, the detachable device 100 can provide an extension function to the existing image capturing apparatus 110. Note that other than the form of an SD card, the detachable device 100 may be configured to be mounted in the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted in a USB socket of the image capturing apparatus 110. The predetermined processing circuit is implemented by, for example, an FPGA (Field Programmable Gate Array) programmed to execute predetermined processing but may be implemented in another form.

The image capturing apparatus 110 is an image capturing apparatus such as a network camera. In this embodiment, the image capturing apparatus 110 incorporates an arithmetic apparatus capable of processing a video but is not limited to this. For example, an external computer such as a PC (Personal Computer) connected to the image capturing apparatus 110 may exist, and the combination may be handled as the image capturing apparatus 110. Additionally, in this embodiment, the detachable devices 100 are mounted in all the image capturing apparatuses 110. Note that FIG. 1 shows four image capturing apparatuses 110, and the detachable devices mounted in these. The number of combinations of devices may be three or less, or five or more. When the detachable device 100 having an image analysis processing function is mounted in the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/sophisticated by mounting the detachable device 100 including an arithmetic apparatus in the image capturing apparatus 110.

The input/output apparatus 130 is an apparatus that performs acceptance of input from a user and output of information (for example, display of information) to the user. In this embodiment, for example, the input/output apparatus 130 is a computer such as a PC, and information is input/output by a browser or a native application installed in the computer.

The image capturing apparatuses 110 and the input/output apparatus 130 are communicably connected via the network 120. The network 120 is configured to include a plurality of routers, switches, cables, and the like, which satisfy the communication standard of, for example, Ethernet®. In this embodiment, the network 120 can be an arbitrary network that enables communication between the image capturing apparatus 110 and the input/output apparatus 130, and can be constructed by an arbitrary scale and arrangement and a communication standard to comply with. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

<Apparatus Arrangement>

(Arrangement of Image Capturing Apparatus)

Figure 2:
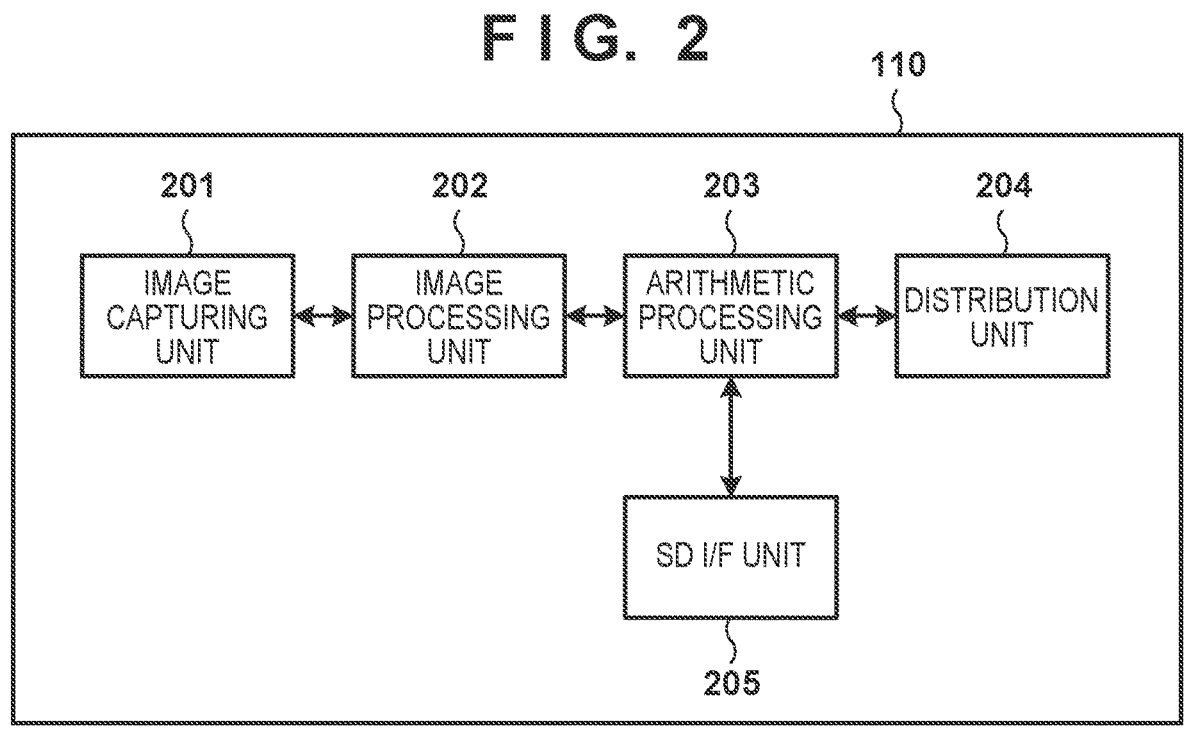
FIG. 2 is a block diagram showing an example of the hardware arrangement of an image capturing apparatus.

The arrangement of the image capturing apparatus 110 will be described next. FIG. 2 is a block diagram showing an example of the hardware arrangement of the image capturing apparatus 110. As the hardware arrangement, the image capturing apparatus 110 includes, for example, an image capturing unit 201, an image processing unit 202, an arithmetic processing unit 203, a distribution unit 204, and an SD I/F unit 205. Note that I/F is an abbreviation of interface.

The image capturing unit 201 is configured to include a lens portion configured to form an image of light, and an image capturing element that performs analog signal conversion according to the formed image of light. The lens portion has a zoom function of adjusting an angle of view, a stop function of adjusting a light amount, and the like. The image capturing element has a gain function of adjusting sensitivity when converting light into an analog signal. These functions are adjusted based on set values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit set values to the lens portion and the image capturing element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 can determine allocation concerning which one of the image capturing apparatus 110 and the detachable device 100 should execute each portion of processing to be executed in the above-described system, and execute processing corresponding to the allocation. Details of processing contents and processing allocation will be described later. The image received from the image processing unit 202 is transferred to the distribution unit 204 or the SD I/F unit 205. The data of the processing result is also transferred to the distribution unit 204.

The distribution unit 204 is configured to include a network distribution engine and, for example, peripheral devices such as a RAM and an ETH PHY module. The ETH PHY module is a module that executes processing of the physical (PHY) layer of Ethernet. The distribution unit 204 converts the image data or the data of the processing result obtained from the arithmetic processing unit 203 into a format distributable to the network 120, and outputs the converted data to the network 120. The SD I/F unit 205 is an interface portion used to connect the detachable device 100, and is configured to include, for example, a power supply, and a mounting part such as an attaching/detaching socket used to attach/detach the detachable device 100. Here, the SD I/F unit 205 is configured in accordance with the SD standard formulated by the SD Association. Communication between the detachable device 100 and the image capturing apparatus 110, such as transfer of an image obtained from the arithmetic processing unit 203 to the detachable device 100 or data obtaining from the detachable device 100, is performed via the SD I/F unit 205.

Figure 3:
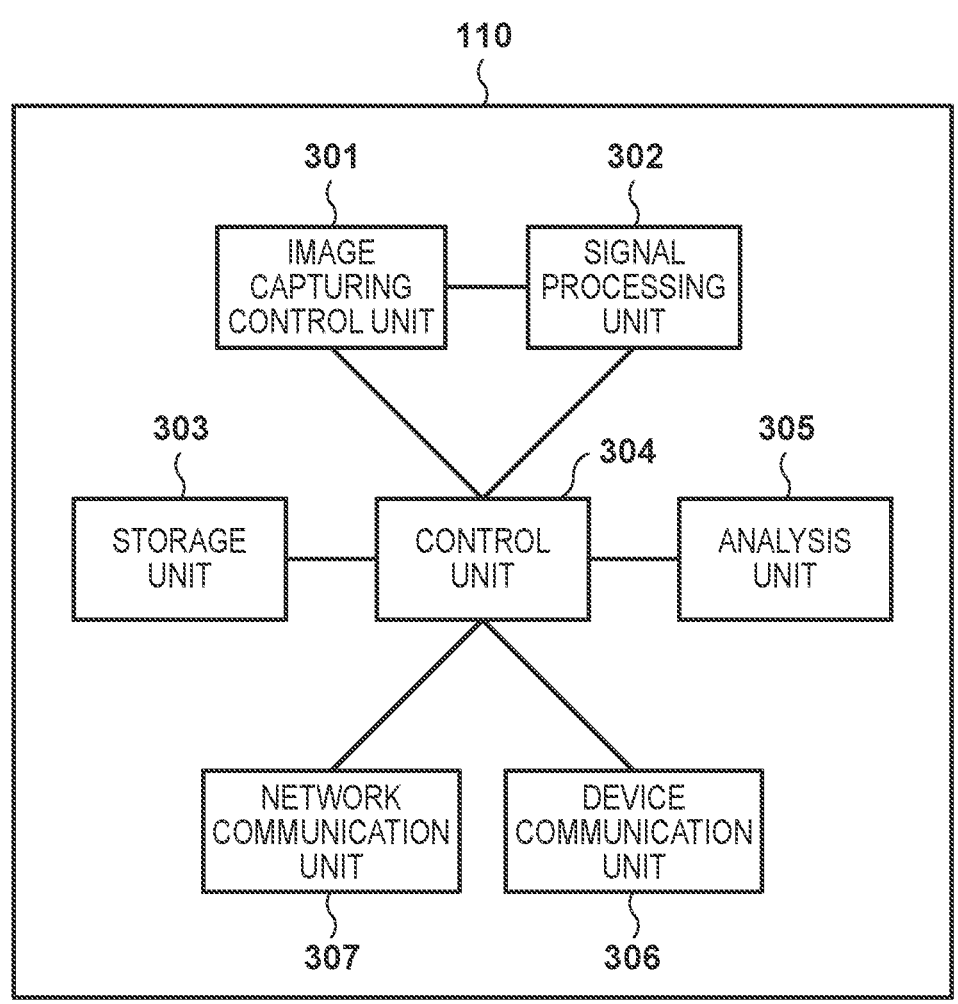
FIG. 3 is a block diagram showing an example of the functional arrangement of the image capturing apparatus.

FIG. 3 shows an example of the functional arrangement of the image capturing apparatus 110. The image capturing apparatus 110 includes, as its functions, for example, an image capturing control unit 301, a signal processing unit 302, a storage unit 303, a control unit 304, an analysis unit 305, a device communication unit 306, and a network communication unit 307.

The image capturing control unit 301 executes control of capturing the peripheral environment via the image capturing unit 201. The signal processing unit 302 performs predetermined processing for the image captured by the image capturing control unit 301, thereby generating data of the captured image. The data of the captured image will simply be referred to as the "captured image" hereinafter. The signal processing unit 302, for example, encodes the image captured by the image capturing control unit 301. The signal processing unit 302 performs encoding for a still image using, for example, an encoding method such as JPEG (Joint Photographic Experts Group). The signal processing unit 302 performs encoding for a video using an encoding method such as H.264/MPEG-4 AVC (to be referred to as "H.264" hereinafter) or HEVC (High Efficiency Video Coding). The signal processing unit 302 may encode an image using an encoding method selected by the user from a plurality of encoding methods set in advance via, for example, an operation unit (not shown) of the image capturing apparatus 110.

The storage unit 303 stores a list (to be referred to as a "first processing list" hereinafter) of analysis processing executable by the analysis unit 305 and a list of post-processes for a result of analysis processing. The storage unit 303 also stores a result of analysis processing to be described later. Note that in this embodiment, processing to be executed is analysis processing. However, arbitrary processing may be executed, and concerning processing associated with the processing to be executed, the storage unit 303 may store the first processing list and the list of post-processes. The control unit 304 controls the signal processing unit 302, the storage unit 303, the analysis unit 305, the device communication unit 306, and the network communication unit 307 to execute predetermined processing.

The analysis unit 305 selectively executes at least one of pre-analysis processing, analysis processing, and post-analysis processing to be described later for a captured image. Pre-analysis processing is processing to be executed for a captured image before analysis processing to be described later is executed. In the pre-analysis processing according to this embodiment, as an example, processing of dividing a captured image to create divided images is executed. Analysis processing is processing of outputting information obtained by analyzing an input image. In the analysis processing according to this embodiment, as an example, processing of receiving a divided image obtained by pre-analysis processing, executing at least one of human body detection processing, face detection processing, and vehicle detection processing, and outputting the analysis processing result is executed. The analysis processing can be processing configured to output the position of an object in a divided image using a machine learning model that has learned to detect an object included in an image using, for example, the technique in J. Redmon and A. Farhadi "YOLO9000: Better Faster Stronger" Computer Vision and Pattern Recognition (CVPR) 2016. Post-analysis processing is processing to be executed after analysis processing is executed. In the post-analysis processing according to this embodiment, as an example, processing of outputting, as a processing result, a value obtained by adding the numbers of objects detected in the divided images based on the analysis processing result for each divided image is executed. Note that the analysis processing may be processing of detecting an object in an image by performing pattern matching and outputting the position of the object.

The device communication unit 306 performs communication with the detachable device 100. The device communication unit 306 converts input data into a format processible by the detachable device 100, and transmits data obtained by the conversion to the detachable device 100. In addition, the device communication unit 306 receives data from the detachable device 10, and converts the received data into a format processible by the image capturing apparatus 110. In this embodiment, as the conversion processing, the device communication unit 306 executes processing of converting a decimal between a floating point format and a fixed point format. However, the present invention is not limited to this, and another process may be executed by the device communication unit 306. Additionally, in this embodiment, the device communication unit 306 transmits a command sequence determined in advance within the range of the SD standard to the detachable device 100, and receives a response from the detachable device 100, thereby performing communication with the detachable device 100. The network communication unit 307 performs communication with the input/output apparatus 130 via the network 120

(Arrangement of Detachable Device)

Figure 4:
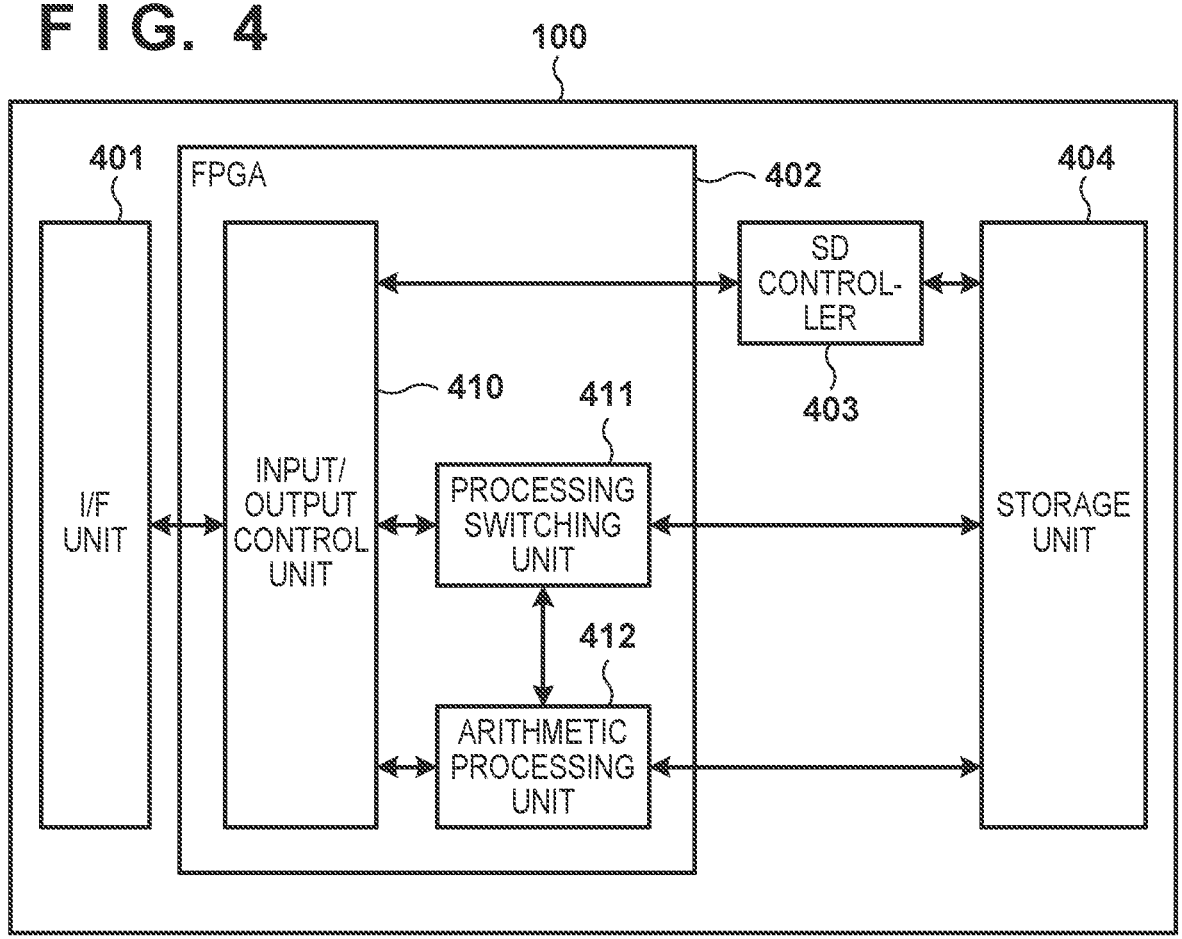
FIG. 4 is a block diagram showing an example of the hardware arrangement of a detachable device.

FIG. 4 is a block diagram showing an example of the hardware arrangement of the detachable device 100. As an example, the detachable device 100 is configured to include an I/F unit 401, an FPGA 402, an SD controller 403, and a storage unit 404. The detachable device 100 is formed into a shape that can be inserted/removed into/from the attaching/detaching socket of the SD I/F unit 205 provided in the image capturing apparatus 110, that is, a shape complying with the SD standard.

The I/F unit 401 is an interface portion used to connect an apparatus such as the image capturing apparatus 110 and the detachable device 100. The I/F unit 401 is configured to include, for example, an electrical contact terminal that receives supply of power from the image capturing apparatus 110 and generates and distributes a power supply to be used in the detachable device 100, and the like. Concerning items defined in (complying with) the SD standard, the I/F unit 401 complies with that, like the SD I/F unit 205 of the image capturing apparatus 110. Reception of images and setting data from the image capturing apparatus 110 and transmission of data from the FPGA 402 to the image capturing apparatus 110 are executed via the I/F unit 401.

The FPGA 402 is configured to include an input/output control unit 410, a processing switching unit 411, and an arithmetic processing unit 412. The FPGA 402 is a kind of semiconductor device capable of repetitively reconstructing an internal logic circuit structure. By processing implemented by the FPGA 402, a processing function can be added (provided) to the apparatus in which the detachable device 100 is mounted. Additionally, since the logic circuit structure can be changed later by the reconstruction function of the FPGA 402, when the detachable device 100 is mounted in, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be executed. The FPGA 402 is activated by writing, from a dedicated I/F, setting data including the information of a logic circuit structure to be generated or reading out the setting data from the dedicated I/F. In this embodiment, the setting data is held in the storage unit 404. When powered on, the FPGA 402 reads out the setting data from the storage unit 404 and generates and activates a logic circuit. However, the present invention is not limited to this. For example, the image capturing apparatus 110 may write the setting data in the FPGA 402 via the I/F unit 401 by implementing a dedicated circuit in the detachable device.

The input/output control unit 410 is configured to include a circuit used to transmit/receive an image to/from the image capturing apparatus 110, a circuit that analyzes a command received from the image capturing apparatus 110, a circuit that controls based on a result of analysis, and the like. Commands here are defined by the SD standard, and the input/output control unit 410 can detect some of them. Details of the functions will be described later. The input/output control unit 410 controls to transmit an image to the SD controller 403 in storage processing and transmit an image to the arithmetic processing unit 412 in image analysis processing. If the setting data of switching of processing is received, the input/output control unit 410 transmits the setting data to the processing switching unit 411. The processing switching unit 411 is configured to include a circuit configured to obtain the information of the image analysis processing function from the storage unit 404 based on the setting data received from the image capturing apparatus 110 and write the information in the arithmetic processing unit 412. The information of the image analysis processing function includes setting parameters representing, for example, the order and types of operations processed in the arithmetic processing unit 412, the coefficients of operations, and the like. The arithmetic processing unit 412 is configured to include a plurality of arithmetic circuits needed to execute the image analysis processing function. The arithmetic processing unit 412 executes each arithmetic processing based on the information of the image analysis processing function received from the processing switching unit 411, transmits the processing result to the image capturing apparatus 110, and/or records the processing result in the storage unit 404. As described above, the FPGA 402 extracts the setting data of an execution target processing function included in setting data corresponding to a plurality of processing functions held in advance, and rewrites processing contents to be executed by the arithmetic processing unit 412 based on the extracted setting data. This allows the detachable device 100 to selectively execute at least one of the plurality of processing functions. In addition, by appropriately adding setting data of processing to be newly added, latest processing can be executed on the side of the image capturing apparatus 110. Note that holding a plurality of setting data corresponding to a plurality of processing functions will be referred to as holding a plurality of processing functions hereinafter. That is, even in a state in which the FPGA 402 of the detachable device 100 is configured to execute one processing function, if the processing contents of the arithmetic processing unit 412 can be changed by setting data for another processing function, this will be expressed as holding a plurality of processing functions.

The SD controller 403 is a known control IC (Integrated Circuit) as defined by the SD standard, and executes control of a slave operation of an SD protocol and control of data read/write for the storage unit 404. The storage unit 404 is formed by, for example, a NAND flash memory, and stores various kinds of information such as storage data written from the image capturing apparatus 110, the information of the image analysis processing function written in the arithmetic processing unit 412, and setting data of the FPGA 402.

Figure 5:
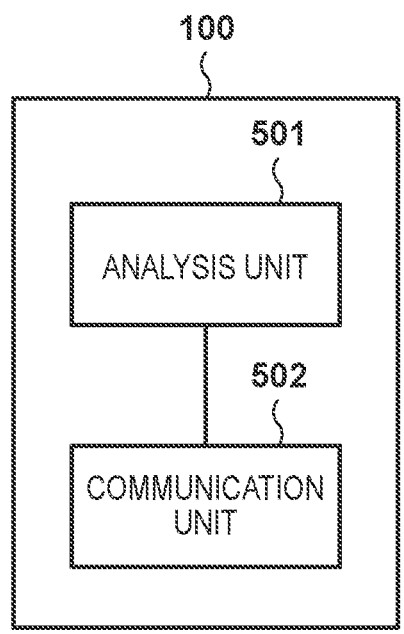
FIG. 5 is a block diagram showing an example of the functional arrangement of the detachable device.

FIG. 5 shows an example of the functional arrangement of the detachable device 100. The detachable device 100 includes, as its functional arrangement, for example, an analysis unit 501 and a communication unit 502. The analysis unit 501 executes analysis processing for an image. For example, if an analysis processing setting request is input, the analysis unit 501 executes setting to set the input analysis processing in an executable state. If an image is input, the analysis unit 501 executes the analysis processing set in the executable state for the input image. In this embodiment, executable analysis processing includes human body detection processing and face detection processing but is not limited to these. For example, it may be processing (face authentication processing) of determining whether a person stored in advance is included in an image. For example, if the degree of matching between the image feature of a person stored in advance and the image feature of a person detected from an input image is calculated, and the degree of matching is equal to or larger than a threshold, it is determined that the person is the person stored in advance. Alternatively, it may be processing of superimposing a predetermined mask image or performing mosaic processing on a person detected from an input image for the purpose of privacy protection. It may be processing of detecting, using a learning model that has learned a specific action of a person by machine learning, whether a person in an image is taking the specific action. Furthermore, it may be processing of determining what kind of region a region in an image is. It may be processing of determining, using, for example, a learning model that has learned buildings, roads, persons, sky and the like by machine learning, what kind of region a region in an image is. As described above, executable analysis processing can be applied to both image analysis processing using machine learning and image analysis processing without using machine learning. Each analysis processing described above may be executed not independently by the detachable device 100 but in cooperation with the image capturing apparatus 110. The communication unit 502 performs communication with the image capturing apparatus 110 via the I/F unit 401.

(Arrangement of Input/Output Apparatus)

Figure 6:
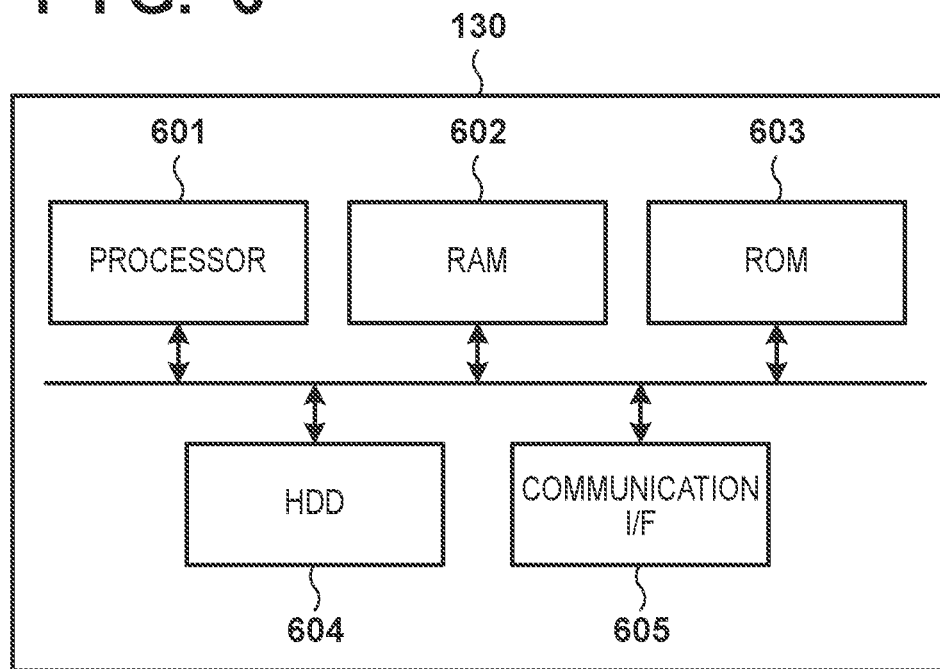
FIG. 6 is a block diagram showing an example of the hardware arrangement of an input/output apparatus.

FIG. 6 shows an example of the hardware arrangement of the input/output apparatus 130. The input/output apparatus 130 is formed as a computer such as a general PC, and is configured to include, for example, a processor 601 such as a CPU, memories such as a RAM 602 and a ROM 603, a storage device such as an HDD 604, and a communication I/F 605, as shown in FIG. 6. The input/output apparatus 130 can execute various kinds of functions by executing, by the processor 601, programs stored in the memories and the storage device.

Figure 7:
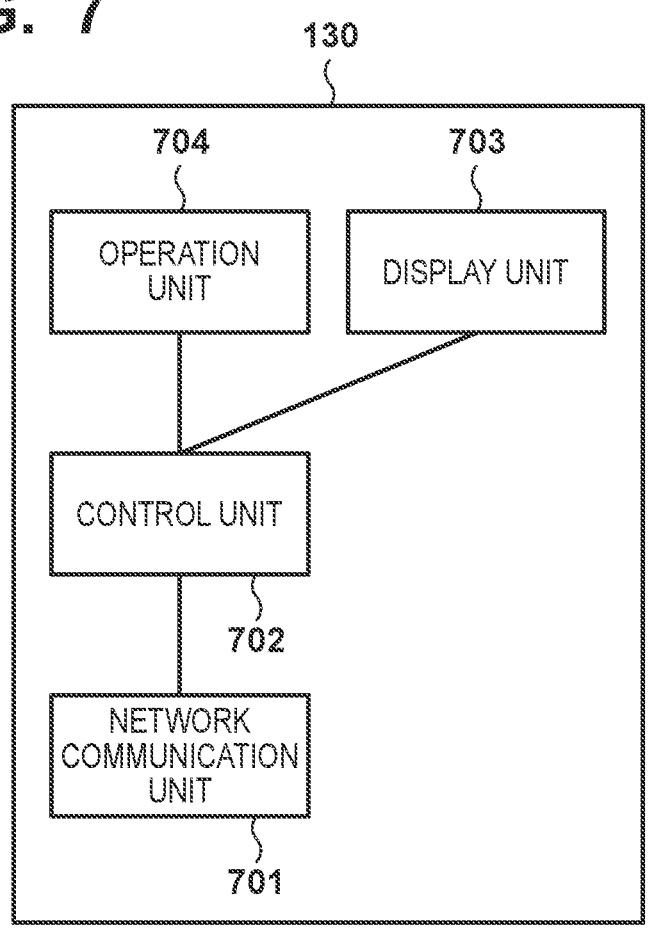
FIG. 7 is a block diagram showing an example of the functional arrangement of the input/output apparatus.

FIG. 7 shows an example of the functional arrangement of the input/output apparatus 130 according to this embodiment. The input/output apparatus 130 includes, as its functional arrangement, for example, a network communication unit 701, a control unit 702, a display unit 703, and an operation unit 704. The network communication unit 701 is connected to, for example, the network 120 and executes communication with an external apparatus such as the image capturing apparatus 110 via the network 120. Note that this is merely an example and, for example, the network communication unit 701 may be configured to establish direct communication with the image capturing apparatus 110 and communicate with the image capturing apparatus 110 without intervention of the network 120 or other apparatus. The control unit 702 controls such that the network communication unit 701, the display unit 703, and the operation unit 704 execute processing of their own. The display unit 703 presents information to the user via, for example, a display. In this embodiment, a result of rendering by a browser is displayed on a display, thereby presenting information to the user. Note that information may be presented by a method such as an audio or a vibration other than screen display. The operation unit 704 accepts an operation from the user. In this embodiment, the operation unit 704 is a mouse or a keyboard, and the user operates these to input a user operation to the browser. However, the operation unit 704 is not limited to this and may be, for example, another arbitrary device capable of detecting a user's intention, such as a touch panel or a microphone.

<Procedure of Processing>

An example of the procedure of processing executed in the system will be described next. Note that processing executed by the image capturing apparatus 110 in the following processes is implemented by, for example, by a processor in the arithmetic processing unit 203, executing a program stored in a memory or the like. However, this is merely an example, and processing to be described later may partially or wholly be implemented by dedicated hardware. In addition, processing executed by the detachable device 100 or the input/output apparatus 130 may also be implemented by, by a processor in each apparatus, executing a program stored in a memory or the like, and processing may partially or wholly be implemented by dedicated hardware.

(Overall Procedure)

Figure 8:
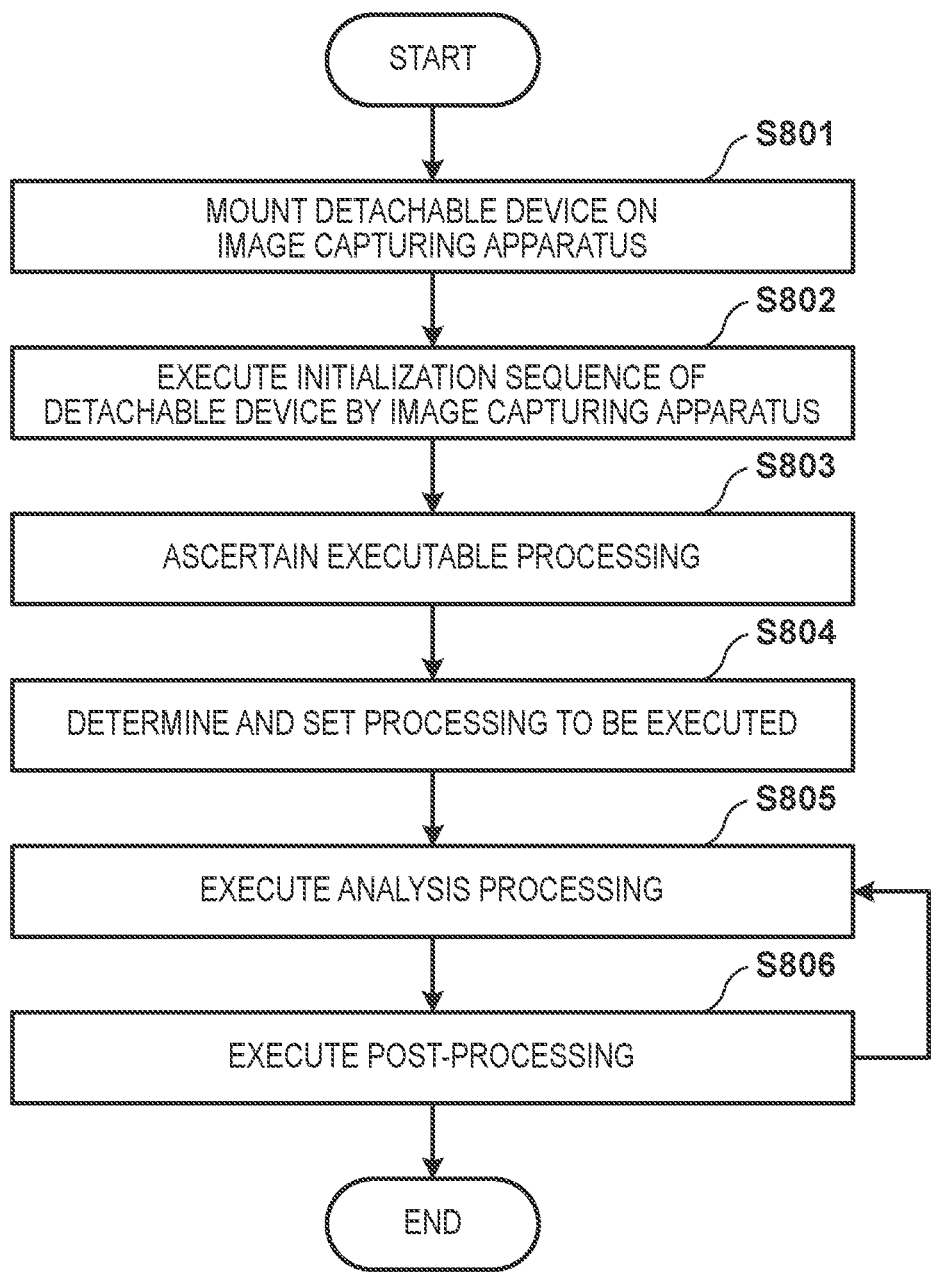
FIG. 8 is a flowchart showing an example of the procedure of processing executed by the system.

FIG. 8 schematically shows a series of procedures of image analysis processing executed by the system. In this processing, first, the user mounts the detachable device 100 in the image capturing apparatus 110 (step S801). The image capturing apparatus 110 executes an initialization sequence of the detachable device 100 (step S802). In this initialization sequence, predetermined commands are transmitted/received between the image capturing apparatus 110 and the detachable device 100, and the image capturing apparatus 110 is thus set in a state in which it can use the detachable device 100. After that, the image capturing apparatus 110 ascertains processing executable by the detachable device 100, and ascertains processing that can be executed locally (that can be executed only by the image capturing apparatus 110 or by the combination of the image capturing apparatus 110 and the detachable device 100) (step S803). Note that although the detachable device 100 can be configured to execute arbitrary processing, processing irrelevant to processing that should be executed on the side of the image capturing apparatus 110 need not be taken into consideration. In an example, the image capturing apparatus 110 may hold a list of executable processes, which is obtained in advance from, for example, the input/output apparatus 130.

In this case, when obtaining, from the detachable device 100, information representing processing executable by the detachable device 100, the image capturing apparatus 110 can ascertain only the executable processing depending on whether the processing is included in the list. Next, the image capturing apparatus 110 determines processing to be executed, and executes setting of the detachable device 100 as needed (step S804). That is, if at least part of processing determined as an execution target is to be executed by the detachable device 100, setting of the detachable device 100 for the processing is executed. In this setting, for example, reconstruction of the FPGA 402 using setting data corresponding to the processing of the execution target can be performed. Then, the image capturing apparatus 110 or the detachable device 100 executes analysis processing (step S805). After that, the image capturing apparatus 110 executes post-processing (step S806). Note that the processes of steps S805 and S806 are repetitively executed. The processing shown in FIG. 8 is executed when, for example, the detachable device 100 is mounted. However, at least part of the processing shown in FIG. 8 may repetitively be executed such that, for example, the process of step S803 is executed again when the detachable device 100 is detached.

(Processing of Ascertaining Excitable Processing)

Figure 9:
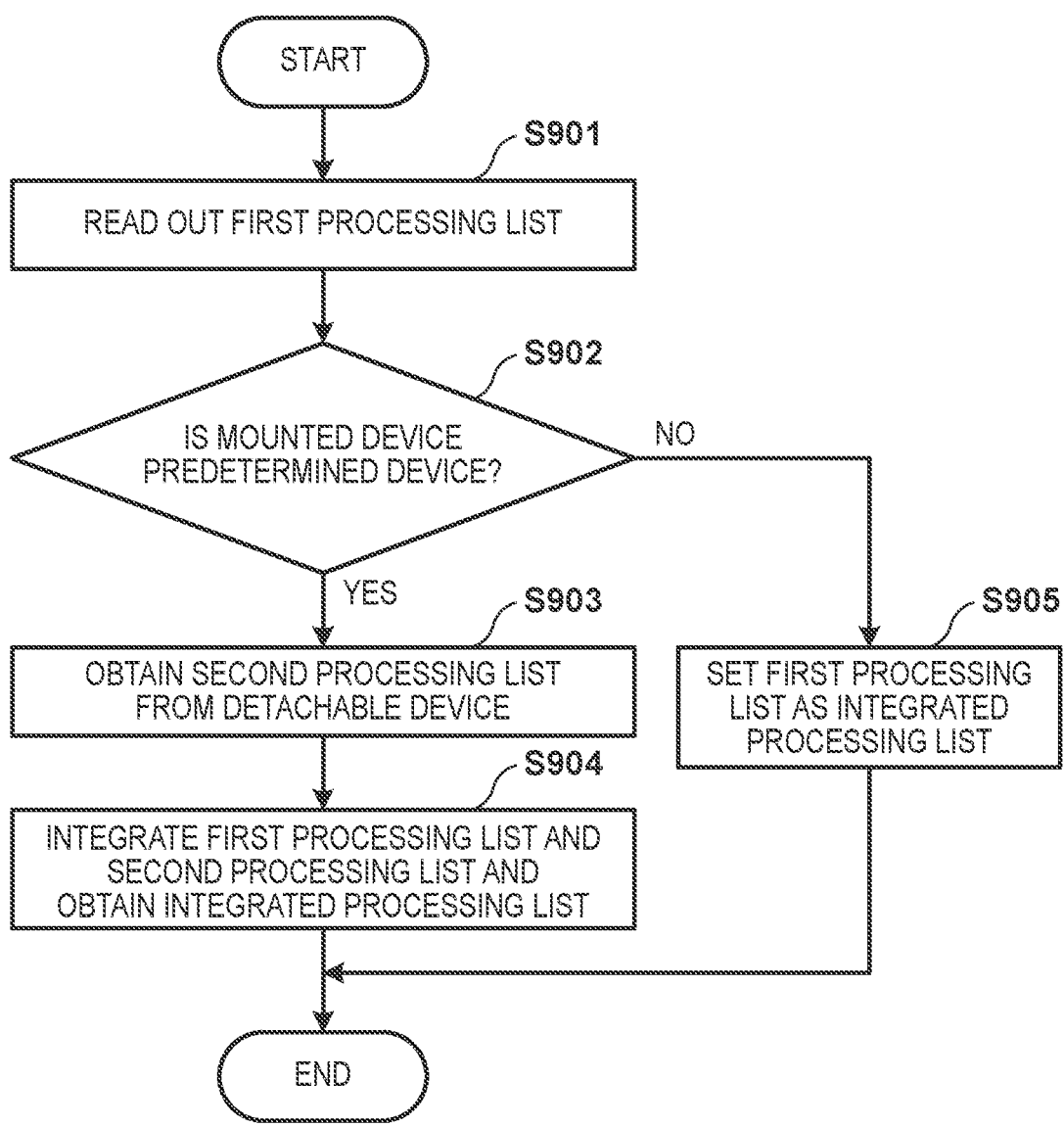
FIG. 9 is a flowchart showing an example of the procedure of processing of ascertaining analysis processing.

FIG. 9 shows an example of the procedure of processing of ascertaining processing executable by the image capturing apparatus 110. This processing corresponds to the process of step S803 in FIG. 8, and can be executed if a device such as the detachable device 100 is mounted on the image capturing apparatus 110 or removed, or if the image capturing apparatus 110 is powered on. In this processing, the image capturing apparatus 110 reads out processing executable by the detachable device 100, integrates it with analysis processing excitable by the image capturing apparatus 110 itself, and ascertains analysis processing executable on the side of the image capturing apparatus 110.

First, the control unit 304 of the image capturing apparatus 110 reads out a first processing list that is a list of processes executable by the analysis unit 305 of the image capturing apparatus 110 itself, which is stored in the storage unit 303 (step S901). Next, the control unit 304 determines whether the mounted device is, for example, a conventional device having only a storage function of a predetermined device such as the detachable device 100 having a specific processing function (step S902). For example, the control unit 304 controls the device communication unit 306 to issue a read request (read command) for a specific address to the mounted device and read out flag data stored at the specific address. The specific address will sometimes be referred to as an "address A" hereinafter. Note that details of the data stored at the address A will be described later. The control unit 304 can determine, based on the read flag data, whether the detachable device 100 is a predetermined device having a specific processing function. However, this is merely an example, and it may be determined by another method whether the mounted device is a predetermined device.

If the mounted device is a predetermined device (YES in step S902), the control unit 304 executes processing of ascertaining processing executable in the device (detachable device 100). The control unit 304 controls the device communication unit 306 to communicate with detachable device 100 and obtain a list (to be referred to as a "second processing list" hereinafter) of processes executable in the detachable device 100 (step S903). The control unit 304 reads out the data stored at the address A as in a case in which, for example, it is determined whether the detachable device 100 is a predetermined device, thereby obtaining the second processing list. Note that, for example, the second processing list can be stored at the same address (address A) as the flag data used to determine whether the detachable device is a predetermined device. In this case, the image capturing apparatus 110 can simultaneously execute the process of step S902 and the process of step S903 by accessing the address A and simultaneously obtaining the flag data and the second processing list. However, the present invention is not limited to this, and these data may be stored at different addresses. After that, the control unit 304 creates an integrated processing list in which the first processing list of processes executable by the image capturing apparatus 110 itself, which is read out from the storage unit 303, and the second processing list obtained from the detachable device are integrated (step S904), and ends the processing.

The integrated processing list represents a list of processes locally executable on the side of the image capturing apparatus 110 without performing processing by an apparatus such as a server apparatus on the network. Note that in this embodiment, the integrated processing list is a list obtained by the union of the processes included in the first processing list and the processes included in the second processing list. The integrated processing list is the list of processes included in at least one of the first processing list and the second processing list. However, the present invention is not limited to this. For example, if another process can be executed by combining a process included in the first processing list and a process included in the second processing list, the other executable processing may be added to the integrated processing list. That is, if new analysis processing can be executed using at least some of the processes included in the first processing list and at least some of the processes included in the second processing list together, the information of the analysis processing can be included in the integrated processing list. For example, face authentication processing can be implemented by a function group of a face detection processing function, a face characteristic extraction processing function, and a face characteristic collation processing function. At this time, if the face detection processing function and the face characteristic extraction processing function are included in the first processing list, and the face characteristic collation processing function is included in the second processing list, the face authentication processing can be included in the integrated processing list.

If the mounted device is not a predetermined device (NO in step S902), the control unit 304 determines that there is no processing executable by the mounted device. Hence, the control unit 304 sets the first processing list of processes executable by the self-apparatus, which is read out from the storage unit 303, as the integrated processing list representing processes locally executable on the side of the image capturing apparatus 110 (step S905), and ends the processing. Note that when the processing shown in FIG. 9 is executed at the time of device removal, the predetermined device is not mounted, as a matter of course, and therefore, the first processing list is handled as the integrated processing list.

This makes it possible to form a list of processes locally executable on the side of the image capturing apparatus 110 based on whether the detachable device 100 capable of executing specific processing is mounted in the image capturing apparatus 110. In addition, when the integrated processing list is presented to the user, as will be described later, the user can select processing that becomes locally executable on the side of the image capturing apparatus 110 by the mounting of the detachable device 100.

Note that in this embodiment, an example in which the integrated processing list is generated has been described. However, the first processing list and the second processing list may separately be managed, and the integrated processing list may not be generated. That is, processes executable by the detachable device 100 and processes executable by the image capturing apparatus 110 without the detachable device 100 may be managed in a distinguishable manner and output. Even if the first processing list and the second processing list are managed in a distinguishable manner, the integrated processing list may be generated and managed. For example, if new processing can be executed using a process included in the first processing list and a process included in the second processing list together, the new processing is included not in the first processing list and the second processing list but in the integrated processing list. Note that when the integrated processing list is output, information representing whether a process included in the integrated processing list is included in the first processing list or the second processing list in a distinguishable manner can be output together. This allows the user to recognize, for example, whether presented processing can be executed without the detachable device 100.

Note that the above-described processing list is provided to an external apparatus that is not included at least in the image capturing apparatus 110, like the input/output apparatus 130, but may not be provided to the outside. For example, the processing list may be output by displaying it on a display if the image capturing apparatus 110 includes a display or by outputting the processing list by an audio if the image capturing apparatus 110 has an audio output function. If the detachable device 100 having an unintended function is erroneously mounted in the image capturing apparatus 110, the user can quickly recognize the mounting error by presenting the processing list on the image capturing apparatus 110. As described above, the image capturing apparatus 110 can output, in an arbitrary format, information based on the first processing list representing processes executable by the image capturing apparatus 110 and the second processing list representing processes executable by the detachable device 100.

Additionally, when the detachable device 100 is removed, the image capturing apparatus 110 executes the processing shown in FIG. 9 again, thereby updating the integrated processing list. At this time, the image capturing apparatus 110 can discard the second processing list concerning the removed detachable device 100. However, the present invention is not limited to this, and the image capturing apparatus 110 may separately store the second processing list concerning a certain detachable device 100 in the storage unit 303 and output the second processing list even in a case in which the detachable device 100 is not mounted. That is, the image capturing apparatus 110 may output the second processing list for the detachable device 100 mounted and removed in the past. The image capturing apparatus 110 may output information representing processing executable using a process included in the second processing list concerning the detachable device 100 mounted and removed in the past and a process included in the first processing list (executable by the self-apparatus). In other words, the image capturing apparatus 110 can output information of processing that cannot be executed only by the self-apparatus. This makes it possible to notify the user that the detachable device 100 capable of executing processing represented by output information exists, and that the processing can be executed by mounting the detachable device 100.

Furthermore, the image capturing apparatus 110 may output the second processing list concerning the detachable device 100 (non-mounted device) that has never been mounted in the image capturing apparatus 110 itself in the past but can be mounted in the image capturing apparatus 110 itself. Information representing such a non-mounted device and analysis processing executable by the non-mounted device can be, for example, obtained by the image capturing apparatus 110 via an external server (not shown). The information representing the non-mounted device and analysis processing executable by the non-mounted device may be, for example, held by the image capturing apparatus 110 in advance.

In addition, the image capturing apparatus 110 may output information representing a processing executable using a process included in the second processing list for the non-mounted device and a process included in the first processing list (executable by the self-apparatus). In other words, the image capturing apparatus 110 can output information of processing that cannot be executed only by the self-apparatus. This makes it possible to notify the user that the detachable device 100 capable of executing processing represented by output information exists, and that the processing can be executed by mounting the detachable device 100.

Note that when storing the second processing list for the detachable device 100 mounted and removed in the past, the image capturing apparatus 110 can store information capable of identifying the device, such as the model number of the detachable device 100, together. When outputting the second processing list concerning the detachable device 100, the image capturing apparatus 110 can output the information capable of identifying the detachable device 100 together. This allows the user to easily recognize which detachable device 100 should be mounted in the image capturing apparatus 110 to use a presented processing function.

(Processing of Determining Analysis Processing Contents)

Figure 10:
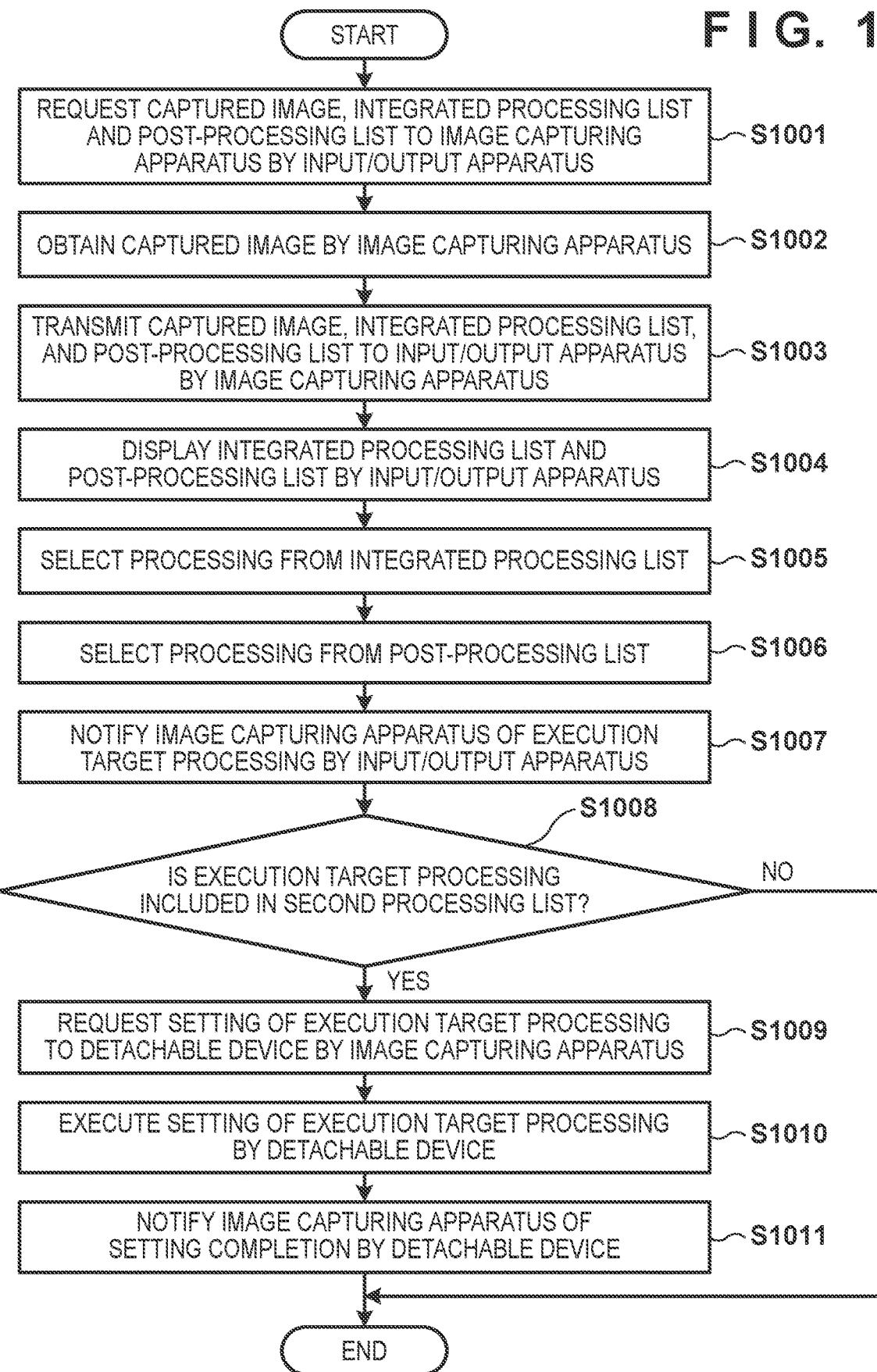
FIG. 10 is a flowchart showing an example of the procedure of processing of determining the contents of analysis processing.

FIG. 10 shows an example of the procedure of processing of determining analysis processing contents by the image capturing apparatus 110. In this processing, analysis processing locally executable on the side of the image capturing apparatus 110 is presented to the user via the input/output apparatus 130, and the input/output apparatus 130 accepts selection of the user. The image capturing apparatus 110 determines analysis processing to be executed in accordance with information representing the user selection accepted via the input/output apparatus 130.

In this processing, first, the control unit 702 of the input/output apparatus 130 controls the network communication unit 701 to execute communication with the image capturing apparatus 110 and request obtaining of a captured image, an integrated processing list, and a post-processing list (step S1001). As an example, the input/output apparatus 130 transmits a request message defined by the ONVIF standard to the image capturing apparatus 110, thereby requesting transmission of information to the image capturing apparatus 110. However, the present invention is not limited to this, and the information transmission request may be done by another message or the like. In the image capturing apparatus 110, based on the request, the image capturing control unit 301 captures the peripheral environment, and the control unit 304 controls the signal processing unit 302 to process an image captured by the image capturing control unit 301 and obtain a captured image (step S1002). Note that the image capturing apparatus 110 may capture the peripheral environment independently of the presence/absence of the request and continuously obtain a captured image. The image capturing apparatus 110 may locally store the captured image or transfer the captured image to another apparatus such as a network server and store. The control unit 304 reads out a post-processing list stored in the storage unit 303. In this embodiment, the post-processing list includes display processing and storage processing but is not limited to this. The control unit 304 controls the network communication unit 307 to transmit the post-processing list, an integrated processing list obtained by the processing shown in FIG. 9, and the captured image obtained in step S1002 to the input/output apparatus 130 (step S1003). As an example, the image capturing apparatus 110 transmits a response message to the request message defined by the above-described ONVIF standard to the input/output apparatus 130, thereby transmitting the information to the input/output apparatus 130. However, the present invention is not limited to this, and the information may be transmitted by another message or the like. Note that only processing to be executed may be taken into consideration here, and the captured image request by the input/output apparatus 130 in step S1001, the captured image obtaining in step S1002, and captured image transmission to the input/output apparatus 130 in step S1003 may not be performed.

The control unit 702 of the input/output apparatus 130 controls the network communication unit 701 to receive the captured image and the integrated processing list from the image capturing apparatus 110. The control unit 702 then controls the display unit 703 to present the integrated processing list and the post-processing list to the user by screen display or the like (step S1004). Note that at this time, the control unit 702 may also present the captured image to the user by screen display or the like. After that, the user confirms the integrated processing list and the post-processing list displayed by the display unit 703, and selects analysis processing to be executed (to be referred to as "execution target processing" hereinafter) from the integrated processing list via the operation unit 704 (step S1005). In addition, the user selects a post-processing to be executed (to be referred to as "execution target post-processing" hereinafter) via the operation unit 704 (step S1006). Details of information presentation to the user in step S1004, analysis processing selection by the user in step S1005, and post-processing selection by the user in step S1006 will be described later. The operation unit 704 outputs the selection results of the execution target processing and the execution target post-processing to the control unit 702. The control unit 702 controls the network communication unit 701 to transmit information representing the execution target processing and the execution target post-processing input from the operation unit 704 to the image capturing apparatus 110 (step S1007).

The control unit 304 of the image capturing apparatus 110 controls the network communication unit 307 to receive the information representing the execution target processing selected by the user from the input/output apparatus 130 and determine whether the execution target processing is processing included in the second processing list (step S1008). If the execution target processing is not included in the second processing list (NO in step S1008), the control unit 304 ends the processing shown in FIG. 10 without making a notification to the detachable device 100 to execute the processing in the image capturing apparatus 110. On the other hand, if the execution target processing is included in the second processing list (YES in step S1008), the control unit 304 controls the device communication unit 306 to transfer an execution target processing setting request to the detachable device 100 (step S1009).

The communication unit 502 of the detachable device 100 receives the execution target processing setting request from the image capturing apparatus 110. At this time, the communication unit 502 can discriminate the execution target processing setting request by the amount of data written from the image capturing apparatus 110 or the type of a write command. Details of the setting request discrimination method will be described later. The communication unit 502 outputs the execution target processing setting request received from the image capturing apparatus 110 to the analysis unit 501. Based on the execution target processing setting request input from the communication unit 502, the analysis unit 501 executes setting to set the detachable device 100 in a state in which the execution target processing can be executed (step S1010). For example, after the completion of the setting processing, the communication unit 502 transmits a setting completion notification to the image capturing apparatus 110 (step S1011). Note that the communication unit 502 need only notify information for inhibiting the image capturing apparatus 110 from writing data at a timing at which the setting of the detachable device 100 is not completed yet, and may notify the image capturing apparatus 110 of the information of the setting completion timing or the like before the setting is actually completed. The control unit 304 of the image capturing apparatus 110 controls the device communication unit 306 to receive the setting completion notification from the detachable device 100.

The setting completion notification from the detachable device 100 to the image capturing apparatus 110 can be executed using, for example, one of the following three methods. In the first notification method, the communication unit 502 outputs a BUSY signal in a case in which the setting of the execution target processing has not ended at the time of write processing of the data of the first block from the image capturing apparatus 110. Output of the BUSY signal is performed by, for example, driving a signal line of DATA defined by the SD standard to a Low state. In this case, the image capturing apparatus 110 confirms the BUSY signal, thereby discriminating whether the setting of the execution target processing is completed. In the second notification method, the time until setting of the execution target processing is completed is stored in advance at the above-described specific address, and the image capturing apparatus 110 reads out the information of the time until the setting completion. After the elapse of the time until the execution target processing setting completion, the image capturing apparatus 110 outputs write data (issues a write command). This allows the image capturing apparatus 110 to transmit the data of the captured image after the setting of the execution target processing is completed. In the third notification method, when the setting of the execution target processing is completed, the analysis unit 501 writes a setting completion flag at a second specific address of the detachable device 100. The image capturing apparatus 110 reads out the data at the second specific address, thereby discriminating whether the setting of the execution target processing is completed. Note that the information of the address at which the setting completion flag is written may be stored at the above-described specific address or may be stored at another address.

As in the processing shown in FIG. 10, when the integrated processing list determined depending on whether the detachable device 100 capable of executing specific processing is mounted in the image capturing apparatus 110 is used, the execution target processing can appropriately be determined in consideration of the state on the side of the image capturing apparatus 110. If the execution target processing includes a process to be executed by the detachable device 100, setting of the detachable device 100 is automatically performed, thereby making a preparation for executing the processing selected by the user without performing a setting operation by the user. If the execution target processing does not include a process to be executed by the detachable device 100, setting of the detachable device 100 is not performed, thereby preventing setting of the detachable device 100 for being unnecessarily performed in a case in which the processing is to be executed only by the image capturing apparatus 110.

(Execution Control of Analysis Processing)

FIG. 11 shows an example of the procedure of control when the image capturing apparatus 110 executes analysis processing. In this processing, first, the image capturing control unit 301 captures the peripheral environment (step S1101). The control unit 304 controls the signal processing unit 302 to process an image captured by the image capturing control unit 301 and obtain a captured image. After that, the control unit 304 controls the analysis unit 305 to execute pre-analysis processing for the captured image input from the control unit 304 and obtain the image of the pre-analysis processing result (step S1102). The control unit 304 determines whether the execution target processing is included in the second processing list (step S1103).

Upon determining that the execution target processing is not included in the second processing list (NO in step S1103), the control unit 304 controls the analysis unit 305 to execute the execution target processing for the image of the pre-analysis processing result in the image capturing apparatus 110 (step S1104). The control unit 304 controls the analysis unit 305 to execute post-analysis processing for the analysis processing result (step S1108), and ends the processing.

If the execution target processing is included in the second processing list (YES in step S1103), the control unit 304 controls the device communication unit 306 to transmit the image of the pre-analysis processing result to the detachable device 100 (step S1105). For example, the control unit 304 issues a write request (write command) of the pre-analysis processing result, thereby transmitting the image of the pre-analysis processing result to the detachable device 100. The communication unit 502 of the detachable device 100 receives the image of the pre-analysis processing result from the image capturing apparatus 110, and outputs the image received from the image capturing apparatus 110 to the analysis unit 501. The analysis unit 501 executes the execution target processing set in step S1010 of FIG. 10 for the image input from the communication unit 502 (step S1106). Then, the communication unit 502 transmits the analysis processing result obtained by the processing of the analysis unit 501 to the image capturing apparatus 110 (step S1107). The control unit 304 of the image capturing apparatus 110 controls the device communication unit 306 to receive the analysis processing result from the detachable device 100. After that, the control unit 304 controls the analysis unit 305 to execute post-analysis processing for the analysis processing result (step S1108).

Transmission of the analysis processing result from the detachable device 100 to the image capturing apparatus 110 is done, for example, in the following way. The analysis unit 501 of the detachable device 100 stores the analysis processing result at the storage destination address for the analysis processing result, which is assigned for each execution target processing. The image capturing apparatus 110 reads out information representing the storage address of the analysis processing result, which is stored at the address A together with, for example, the second processing list, and issues a read request (read command) for the storage address. The detachable device 100 receives the read request for the storage address of the analysis processing result via the communication unit 502, and outputs the analysis processing result to the image capturing apparatus 110. Note that the image capturing apparatus 110 can issue the read request for the storage address of the analysis processing result, for example, after the elapse of an estimated processing time stored at the address A. In addition, the detachable device 100 may output a BUSY signal from the write request of the last block of the pre-analysis processing result transmitted from the image capturing apparatus 110 to the end of the execution target processing. In this case, the image capturing apparatus 110 can issue the read request for the storage address of the analysis processing result when the BUSY signal is not received any more. This allows the image capturing apparatus 110 to obtain the processing result after the end of the processing.

With the above-described processing, the image capturing apparatus 110 can determine, in accordance with the selected execution target processing, whether to transfer the captured image to the detachable device 100. It is therefore possible to execute analysis processing of the captured image while the user is not conscious of which one of the image capturing apparatus 110 or the detachable device 100 should execute analysis processing.

(Execution Control of Post-Processing)

FIG. 12 shows an example of the procedure of control when the image capturing apparatus 110 executes post-processing. In this processing, the control unit 304 of the image capturing apparatus 110 determines whether "display" is included in the execution target post-processing (step S1201). Upon determining that display is included in the execution target post-processing (YES in step S1201), the control unit 304 controls the network communication unit 307 to transmit the result of analysis processing to the input/output apparatus 130 (step S1202). The control unit 702 of the input/output apparatus 130 controls the network communication unit 701 to receive the result of analysis processing from the image capturing apparatus 110, and then controls the display unit 703 to present the result of analysis processing to the user by screen display or the like (step S1203). On the other hand, if the control unit 304 determines that display is not included in the execution target post-processing (NO in step S1201), the processes of steps S1202 and S1203 are not executed.

In addition, the control unit 304 of the image capturing apparatus 110 determines whether "storage" is included in the execution target post-processing (step S1204). Note that the determination of step S1204 may be executed before step S1201 or may be executed in parallel to the step S1201. Upon determining that storage is included in the execution target post-processing (YES in step S1204), the control unit 304 controls the storage unit 303 to store the result of analysis processing and ends the processing. On the other hand, upon determining that storage is not included in the execution target post-processing (NO in step S1204), the control unit 304 ends the processing without executing the process of step S1205.

As described above, in accordance with the selected post-processing, the image capturing apparatus 110 can execute transfer of the result of analysis processing to the input/output apparatus 130 or storage in the storage unit 303 without accepting a special setting operation of the user and improve the convenience.

(Communication Between Image Capturing Apparatus 110 and Detachable Device 100)

Communication between the image capturing apparatus 110 and the detachable device 100 will be described here. The arithmetic processing unit 203 of the image capturing apparatus 110 and the SD controller 403 of the detachable device 100 are connected by a power supply line, a GND line, a clock line, a command line, and a data line via the device insertion socket of the SD I/F unit 205 of the image capturing apparatus 110. Note that the clock line, the command line, and the data line are connected via the FPGA 402. On the clock line, a synchronization clock output from the arithmetic processing unit 203 is communicated. On the command line, a command issued for an operation request from the arithmetic processing unit 203 to the SD controller 403 and a response to the command from the SD controller 403 to the arithmetic processing unit 203 are communicated. On the data line, write data from the arithmetic processing unit 203 and read data from the detachable device 100 are communicated. In addition, the arithmetic processing unit 203 discriminates High and Low of a device detect signal of the device insertion socket of the SD I/F unit 205, thereby recognizing whether the detachable device 100 is inserted.

The arithmetic processing unit 203 issues a command to the SD controller 403 on the command line after power supply. Upon receiving a response from the SD controller 403 and output data representing device information as an SD card, the arithmetic processing unit 203 sets a voltage for data communication, a communication speed (clock frequency), and the like.

Figure 13A:
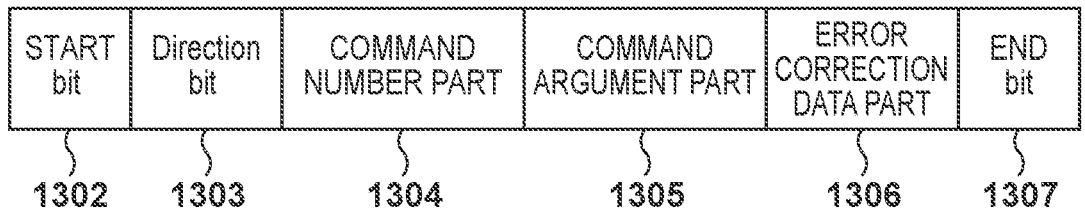
FIGS. 13A and 13B are views showing the structures of a command and a response.
Figure 13B:
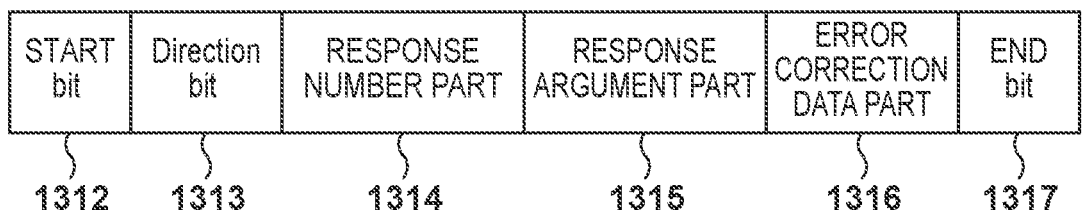

FIGS. 13A and 13B show the structures of a command and a response communicated on the command line. The command and response have structures complying with the SD standard. A command 1301 issued from the arithmetic processing unit 203 to the SD controller 403 is configured to include a command number part 1304, a command argument part 1305, and an error correction data part 1306. In the command number part 1304, a value indicating the type of the command is described. For example, if a value "23" is stored in the command number part 1304, this indicates that the command is a block count designation command for designating the number of data blocks. If a value "25" is stored in the command number part 1304, this indicates that the command is a multi-write command. If a value "12" is stored in the command number part 1304, this indicates that the command is a data transfer stop command. In the command argument part 1305, pieces of information such as the number of transfer data blocks and the write/read address of a memory are designated in accordance with the type of the command. A command start bit 1302 representing the start position of the command is added to the first bit of the command, and a command end bit 1307 representing the end of the command is added to the final bit of the command. Additionally, a direction bit 1303 representing that the command is a signal output from the image capturing apparatus 110 to the detachable device 100 is also added after the command start bit 1302.

A response 1311 returned from the SD controller 403 in response to the command from the arithmetic processing unit 203 includes a response number part 1314 representing for which command the response is returned, a response argument part 1315, and an error correction data part 1316. A response start bit 1312 representing the start position of the response is added to the first bit of the response, and a response end bit 1317 representing the end position of the response is added to the final bit of the response. Additionally, a direction bit 1313 representing that the response is a signal output from the detachable device 100 to the image capturing apparatus 110 is also added after the response start bit 1312. In the response argument part 1315, pieces of information such as the status of the SD card are stored in accordance with the command type.

A method of transmitting/receiving data between the arithmetic processing unit 203 and the detachable device 100 will be described next. In the SD I/F unit 205, data transfer is performed on a block basis in both data write and read.

The following two methods are used by the arithmetic processing unit 203 to transfer the data of a plurality of blocks to the detachable device 100. In the first method, after the number of blocks is designated by a block count designation command for transfer data, data of the designated number of blocks are transferred by a multi-write command. In the block count designation command, the number of blocks of write data is designated by the command argument part 1305. In the multi-write command, the address of the storage unit 404 at which the data should be written is designated by the command argument part 1305. In the second method, data transfer is started by issuing a multi-write command without issuing a block count designation command. When the data transfer ends, a transfer stop command is issued, thereby ending the processing. At this time, the command argument part 1305 of the multi-write command designates only the address of the storage unit 404 at which the data should be written. The arithmetic processing unit 203 can arbitrarily switch the two write methods.

Note that when performing storage processing, the FPGA 402 directly inputs a command and data sent from the arithmetic processing unit 203 to the SD controller 403, and the SD controller 403 stores the received data at the address of the storage unit 404 designated by the command. When performing image analysis processing, the FPGA 402 executes analysis processing for data sent from the arithmetic processing unit 203, and outputs the data of the processing result and information for designating a predetermined address of the storage unit 404 to the SD controller 403. The SD controller 403 stores the processing result at the designated address of the storage unit.

The following two methods are used by the arithmetic processing unit 203 to read out the data of a plurality of blocks from the detachable device 100. In the first method, after the number of blocks is designated by a block count designation command, a multi-read command is issued, and data of the designated number of blocks are read out. In the block count designation command, the number of blocks of read data is designated by the command argument part 1305. The command argument part 1305 of the multi-read command designates the address of the memory of the data read source. In the second method, data read is started by issuing a multi-read command without issuing a block count designation command, and the processing is ended by issuing a transfer stop command. The arithmetic processing unit 203 can arbitrarily switch the two read methods.

Note that if write data or read data is data of one block, a single-write command or a single-read command is issued, thereby executing data write or read without issuing a block count designation command and a transfer stop command. In the single-write command and the single-read command as well, the command argument part 1305 designates the address of the storage unit 404 of the access target, as in the above description.

The arithmetic processing unit 203 performs write to the detachable device 100, thereby transmitting data as the target of storage processing or image analysis processing to the detachable device 100. In addition, the arithmetic processing unit 203 performs read from the detachable device 100, thereby obtaining image data stored in the storage unit 404, a processing result of image analysis processing, and the information of the image analysis processing function held by the detachable device 100.

Figure 14:
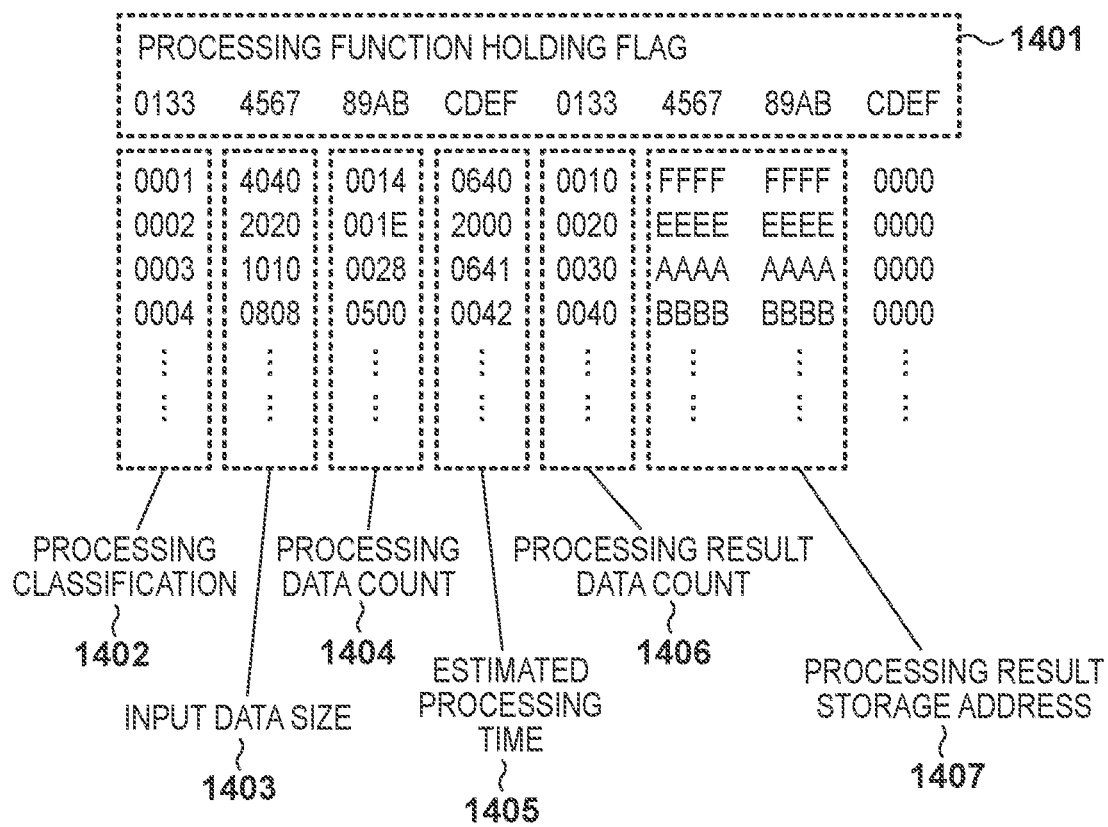
FIG. 14 is a view schematically showing data at an address that stores information of processing functions.

The detachable device 100 according to this embodiment stores the information of a processing function held by the self-device at the specific address A of the storage unit 404. The arithmetic processing unit 203 of the image capturing apparatus 110 can confirm the information of a processing function held by the detachable device 100 by issuing a multi-read command or a single-read command to the address A. The information of a processing function here includes information representing whether the device holds the processing function, a time required until completion when the processing is executed, the data size of a processing result, and the information of an address at which the processing result is stored. FIG. 14 shows an example of the information of processing functions. A processing function holding flag 1401 represents that the detachable device 100 has image analysis processing functions. The image capturing apparatus 110 confirms the processing function holding flag 1401, thereby determining whether the detachable device 100 has image analysis processing functions. A processing function class 1402 represents analysis processing held by the detachable device 100. An input data size 1403 and a processing data count 1404 represent information concerning the data input specifications of each processing function. An estimated processing time 1405 represents a time needed from data into to processing result output, and a processing result data count 1406 represents the number of data of a processing result. A processing result storage address 1407 represents a location where the processing result is stored in the storage unit 404. The arithmetic processing unit 203 reads out the data at the address A of the storage unit 404 as shown in FIG. 14, thereby obtaining a processing function table as shown in FIG. 15.

If a read command to the address A is not issued by the arithmetic processing unit 203, the detachable device 100 judges that the self-device is a device that does not use an image analysis processing function. In this case, concerning data to be transferred, the detachable device 100 can execute only storage processing for the storage unit 404. Hence, for a device that does not need an image analysis processing function, the detachable device 100 can function only as a memory device. A method of storing the information of processing functions at the specific address A of the storage unit 404 has been described here. However, the present invention is not limited to this. For example, the information of processing functions may be added to the response argument part 1315 in a response to a command that is used at the time of initialization of the detachable device 100.

Note that the image capturing apparatus 110 executes read of the address A of the storage unit 404, for example, after the end of initialization of the detachable device 100. In addition, the image capturing apparatus 110 discards the read information if the device is not detected in the socket any more. If the device is inserted into the socket after the information is discarded, the image capturing apparatus 110 reads out the value of the address A again after the end of initialization. Hence, if a different detachable device is inserted, the image capturing apparatus 110 can read and set the information of functions held by the detachable device.

(Switching Control Between Storage Processing and Image Analysis Processing)

A method of automatically switching between storage processing and image analysis processing by the detachable device 100 will be described next. This processing is automatic determination processing of determining whether the detachable device 100 directly stores image data received from the image capturing apparatus 110 or performs image analysis processing for the image data. In an example, the image capturing apparatus 110 transmits a special command, thereby controlling which one of storage of image data transmitted to the detachable device 100 and image analysis processing for the image data should be executed by the detachable device 100. However, it is not easy to define such a special command because of the standard the detachable device 100 complies with. Hence, in this embodiment, processing to be executed by the detachable device 100 can be switched by the following method without defining a special command. Note that in the following processing example, communication between the image capturing apparatus 110 and the detachable device 100 is performed by a method complying with the SD standard. However, the present invention is not limited to this. That is, processing similar to processing to be described below can be executed using a command or the like according to a predetermined standard the detachable device 100 complies with.

[Control Based on Transfer Data Amount]

Figure 16:
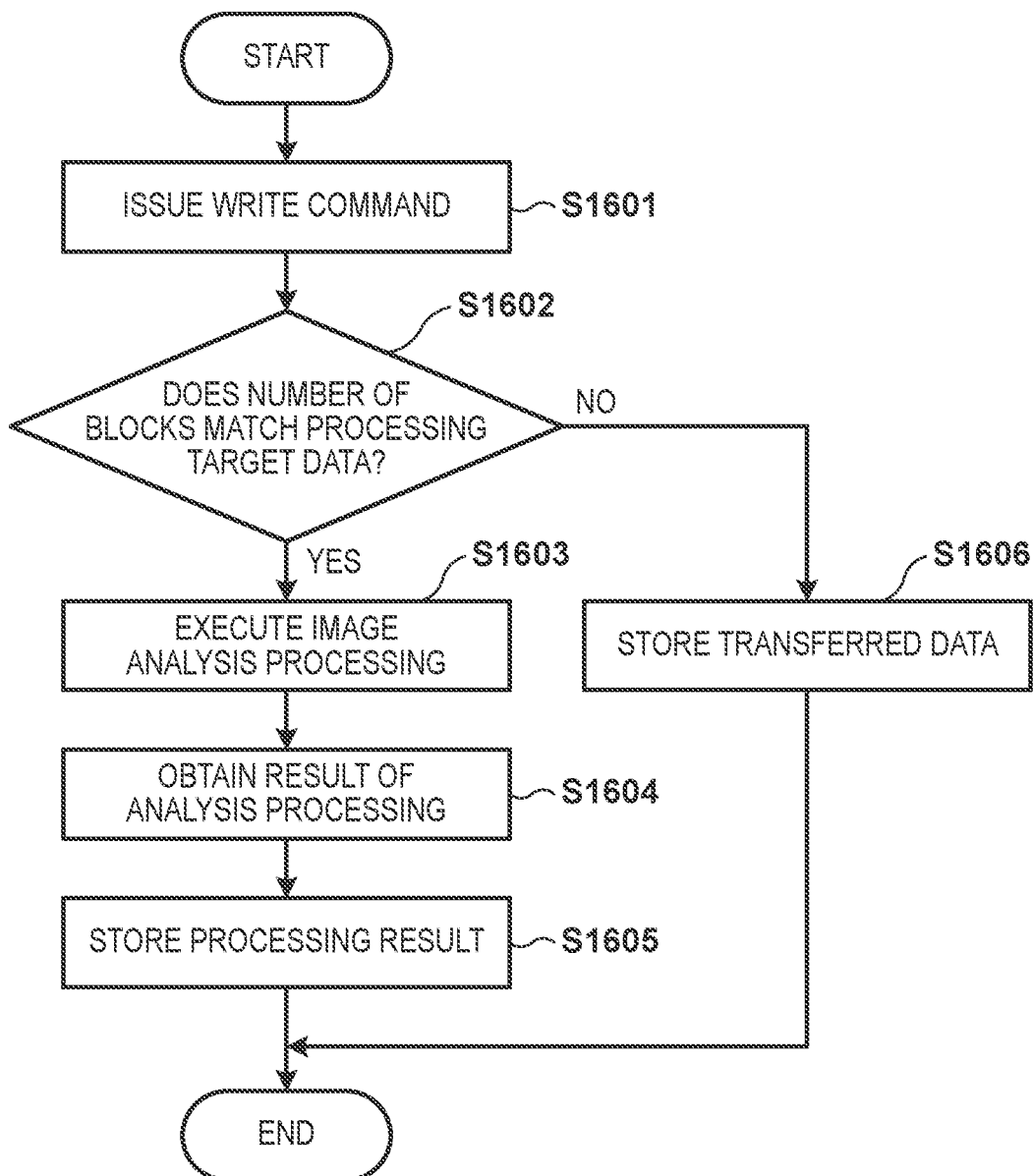
FIG. 16 is a flowchart showing an example of the procedure of processing of automatically switching between storage processing and image analysis processing.

FIG. 16 shows an example of the procedure of control of automatically switching between storage processing and image analysis processing based on the number of data blocks to be transferred to the detachable device 100.

First, the arithmetic processing unit 203 of the image capturing apparatus 110 issues a write command complying with the SD standard to the detachable device 100, and transfers data (step S1601). The FPGA 402 of the detachable device 100 determines whether the number of blocks of the data written by the arithmetic processing unit 203 matches the data amount at the time of execution of image analysis processing (step S1602). The FPGA 402 can identify the number of blocks of data by confirming the number of data blocks described in the command argument part 1305 of a block count designation command. If the block count designation command is not issued, the FPGA 402 may identify the number of blocks of data by counting the number of blocks transferred until a data transfer stop command is issued.

If the number of blocks of the data written by the arithmetic processing unit 203 matches the data amount at the time of execution of image analysis processing (YES in step S1602), the FPGA 402 executes image analysis processing for the transferred data (step S1603). The FPGA 402 obtains the processing result (step S1604), issues a write command to the SD controller 403, and stores the obtained processing result at the processing result storage address 1407 of the storage unit 404 according to the class of the analysis processing (step S1605). On the other hand, if the number of blocks of the data written by the arithmetic processing unit 203 does not match the data amount at the time of execution of image analysis processing (NO in step S1602), the transferred data is directly stored in the storage unit 404 (step S1606). For example, the FPGA 402 issues a command similar to the write command issued by the arithmetic processing unit 203 to the SD controller 403, and directly transfers the transferred data. The SD controller 403 stores the transferred data at the address of the storage unit 404 designated by the write command.

The detachable device 100 holds information as shown in FIG. 15 at the specific address A of the storage unit 404, and recognizes that, for example, the number of input data when executing analysis processing A is 20 blocks. For this reason, if the number of blocks of data written by the arithmetic processing unit 203 is 20 blocks, the FPGA 402 executes the analysis processing A, and otherwise, does not execute the analysis processing A. Note that the FPGA 402 may change the execution target analysis processing in accordance with the number of input blocks such that, for example, if the number of blocks of data written by the arithmetic processing unit 203 is 40 blocks, the FPGA 402 executes analysis processing C.

[Control Based on Write Address]

Figure 17:
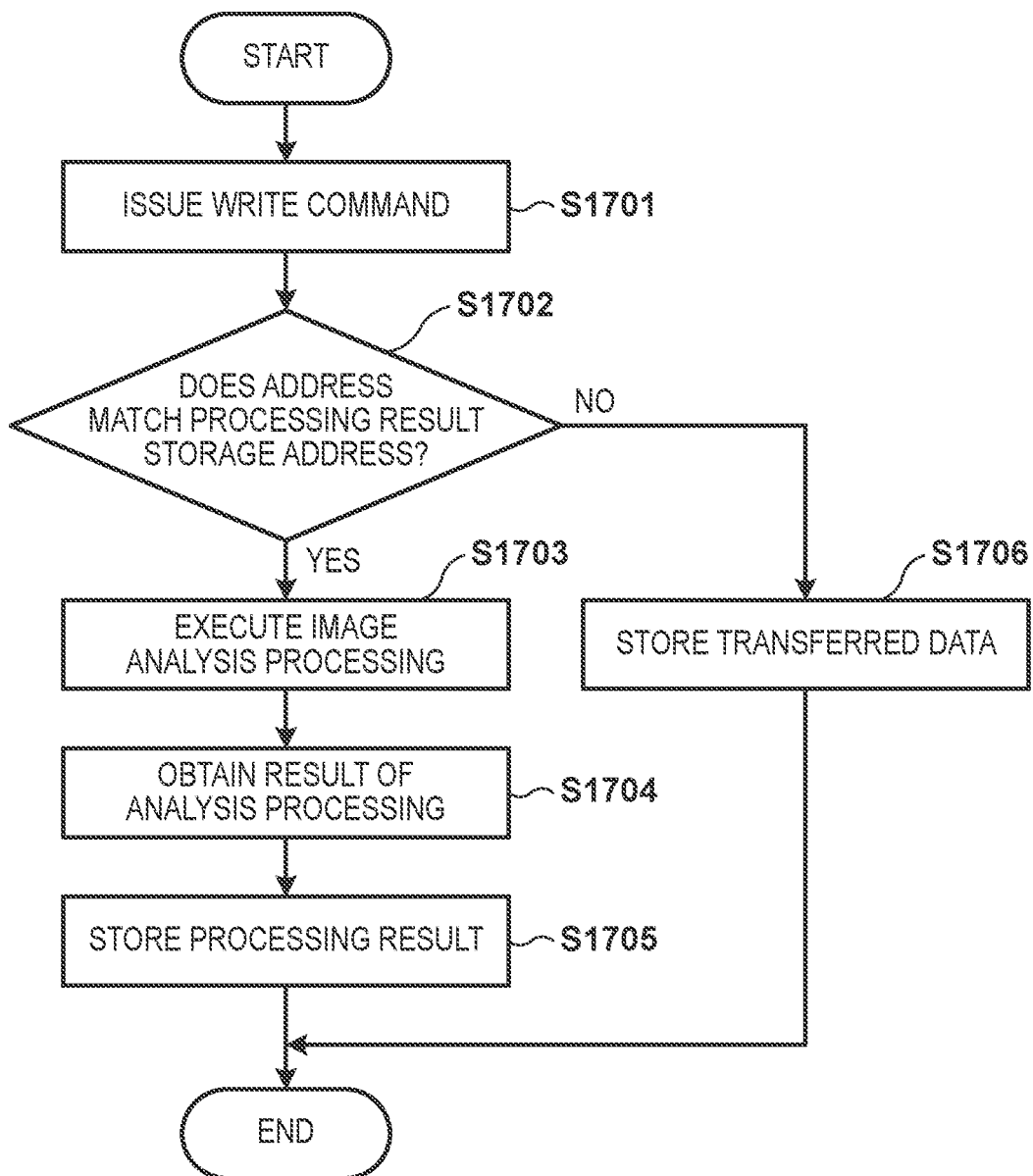
FIG. 17 is a flowchart showing an example of the procedure of processing of automatically switching between storage processing and image analysis processing.

FIG. 17 shows an example of the procedure of control of switching between storage processing and image analysis processing based on a write address designated by the command argument part 1305 of a write command. In this processing as well, the arithmetic processing unit 203 of the image capturing apparatus 110 issues a write command to the SD controller 403 (step S1701). The FPGA 402 determines whether a write address designated by the command argument part 1305 and representing an information storage destination in the storage unit 404 matches the processing result storage address 1407 shown in FIG. 14 (step S1702). If the write address designated by the command argument part 1305 matches the processing result storage address 1407 (YES in step S1702), the FPGA 402 executes image analysis processing corresponding to the address for the transferred data (step S1703). The FPGA 402 obtains the processing result (step S1704), issues a write command to the SD controller 403, and stores the obtained processing result at the processing result storage address 1407 of the storage unit 404 (step S1705). On the other hand, if the write address designated by the command argument part 1305 does not match the processing result storage address 1407 (NO in step S1702), the FPGA 402 directly stores the transferred data in the storage unit 404 (step S1706). For example, the FPGA 402 issues a command similar to the write command issued by the arithmetic processing unit 203 to the SD controller 403, and directly transfers the transferred data. The SD controller 403 stores the transferred data at the address of the storage unit 404 designated by the write command.

The detachable device 100 holds information as shown in FIG. 15 at the specific address A of the storage unit 404, and recognizes that, for example, an analysis result storage address at the time of execution of the analysis processing A should be 0xFFFFFFFF. For this reason, if the write address designated by the command obtained from the arithmetic processing unit 203 is 0xFFFFFFFF, the FPGA 402 executes the analysis processing A, and otherwise, does not execute the analysis processing A. Note that the FPGA 402 may change the execution target analysis processing in accordance with the write address designated by the command such that, for example, if the write address designated by the command obtained from the arithmetic processing unit 203 is 0xEEEEEEEE, the FPGA 402 executes analysis processing C.

As described above, the detachable device 100 can determine, based on the number of blocks or the write destination address of data written by the arithmetic processing unit 203, whether to perform image analysis processing or directly store the data. Note that the detachable device 100 may determine, in accordance with the combination of the number of blocks and the write destination address of data written by the arithmetic processing unit 203, whether to perform image analysis processing or directly store the data. For example, if both the number of blocks and the write destination address of data match the processing data count 1404 and the processing result storage address 1407, image analysis processing may be executed. In addition, if at least one of the number of blocks and the write destination address of data does not match the processing data count 1404 or the processing result storage address 1407 of any image analysis processing, storage processing can be executed.

With the above-described processing, the detachable device 100 can perform image analysis processing for data for which image analysis processing should be executed and store data that should be stored without executing image analysis processing without introducing an additional procedure for instructing whether to execute image analysis processing. Since this can prevent the system from becoming complex and obviate the necessity of executing an additional procedure, image analysis processing can quickly be started.

Note that the processing shown in FIG. 17 may be executed in combination with the processing shown in FIG. 16. That is, if the number of blocks of image data and the storage destination address of information are values associated with image analysis processing, the image analysis processing may be executed.

Note that when performing image analysis processing, not only the processing result but also the transferred data as the target of analysis processing may be stored together in an area of the storage unit 404 different from the processing result storage address 1407. Additionally, in the above-described control, if the detachable device 100 has a plurality of image analysis processing functions, the type of image analysis processing to be executed may be determined in accordance with the number of write blocks or the write address of data. For example, if the number of blocks or the write destination address of data matches the processing data count 1404 or the processing result storage address 1407 for certain image analysis processing of the plurality of image analysis processing functions, the image analysis processing can be executed.

[Control Based on Command]

Figure 18:
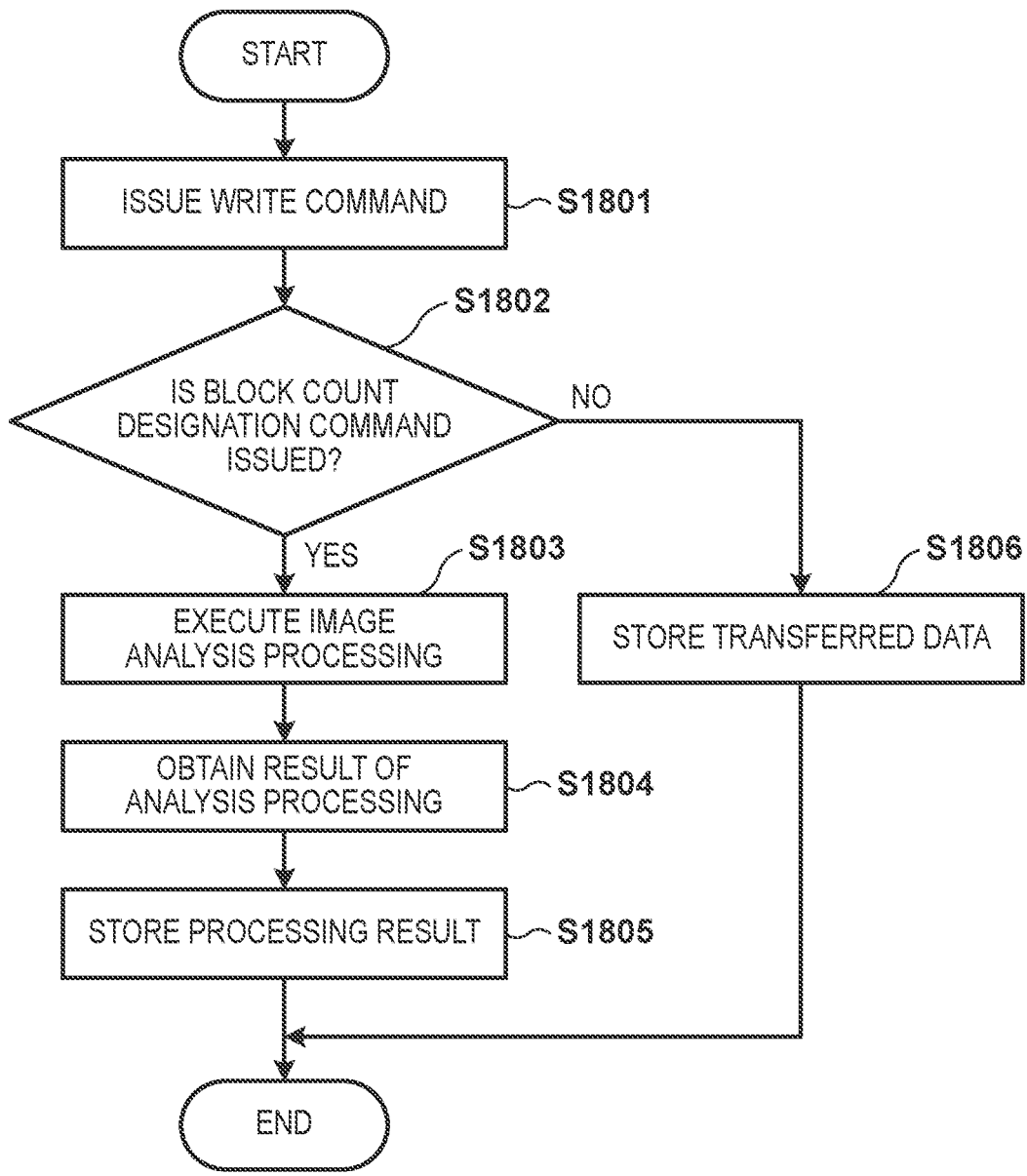
FIG. 18 is a flowchart showing an example of the procedure of processing of automatically switching between storage processing and image analysis processing.

FIG. 18 shows an example of the procedure of control of switching between storage processing and image analysis processing based on a command. In the SD standard, a first protocol that writes data after a block count designation command is issued, and a second protocol that writes data without issuing a block count designation command are provided as protocols when writing data. Note that the second protocol issues a data transfer stop command when ending data write. In this processing example, image analysis processing is executed based on data transmission by the first protocol, and when data is transmitted by the second protocol, storage processing of storing image data in the storage unit 404 is executed without executing image analysis processing. Hence, the FPGA 402 of the detachable device 100 determines, depending on whether a block count designation command is issued for transmission of image data, whether to execute image analysis processing.

In this processing as well, first, the arithmetic processing unit 203 of the image capturing apparatus 110 issues a write command to the detachable device 100, and transfers data (step S1801). Here, the FPGA 402 of the detachable device 100 determines whether a block count designation command is issued (step S1802). If a block count designation command is issued (YES in step S1802), the FPGA 402 executes image analysis processing for the transferred data (step S1803), and obtains the processing result (step S1804). The FPGA 402 designates a predetermined processing result storage address according to the class of analysis processing shown in FIG. 14 and issues a write command to the SD controller 403, thereby storing the data of the processing result in the storage unit 404 (step S1805). If a block count designation command is not issued (NO in step S1802), the FPGA 402 issues a write command similar to the command issued by the arithmetic processing unit 203 to the SD controller 403. The FPGA 402 directly transmits the transferred data to the SD controller 403. The SD controller 403 stores the data at the address of the storage unit 404 designated by the write command from the FPGA 402 (step S1806).

Note that the block count designation command may be another predetermined command. That is, a predetermined command serving as a trigger to execute image analysis processing is set in advance, and the FPGA 402 executes image analysis processing for input image data based on at least reception of the predetermined command. Alternatively, another information capable of identifying the protocol to be used may be used. Note that, for example, upon receiving a predetermined command, the FPGA 402 may execute the processing shown in FIG. 16 or 17 to determine whether to execute image analysis processing for input image data.

As described above, by instructing execution of image analysis processing by a command such as a block count designation command, the image capturing apparatus 110 can instruct processing to be executed by the detachable device 100 within the range of the protocol complying with the SD standard.

It can be said that at least a part of the above-described processing is processing of determining whether to execute image analysis processing depending on whether a command complying with the SD standard for transmission of image data includes a value associated with image analysis processing executable by the FPGA 402. That is, in the processing shown in FIG. 16, image analysis processing is executed when "23" is stored in the command number part 1304, and a value indicating a predetermined number of blocks is stored in the command argument part 1305. In the processing shown in FIG. 17, image analysis processing is executed when a value indicating a processing result storage address is stored in the command argument part 1305. In the processing shown in FIG. 18, image analysis processing is executed when "23" is stored in the command number part 1304. As described above, by setting the contents of the command at the time of transmission of image data to a predetermined value associated with image analysis processing, it is possible to flexibly control, using a command complying with the SD standard, which one of image analysis processing and storage processing should be executed by the FPGA 402.

(Read of Processing Result)

A method of reading out, by the image capturing apparatus 110, the processing result of image analysis processing stored in the detachable device 100 will be described next. The arithmetic processing unit 203 designates the processing result storage address 1407 shown in FIG. 14 in the detachable device 100, and issues a read command to read out data as many as the processing result data count 1406 of each analysis processing. The SD controller 403 receives the read command via the FPGA 402, and outputs the data of the processing result stored at the designated address of the storage unit 404 to the arithmetic processing unit 203 of the image capturing apparatus 110. This allows the image capturing apparatus 110 to obtain the processing result of image analysis processing.

(Presentation of Information to User and Acceptance of User Selection)

Figure 19:
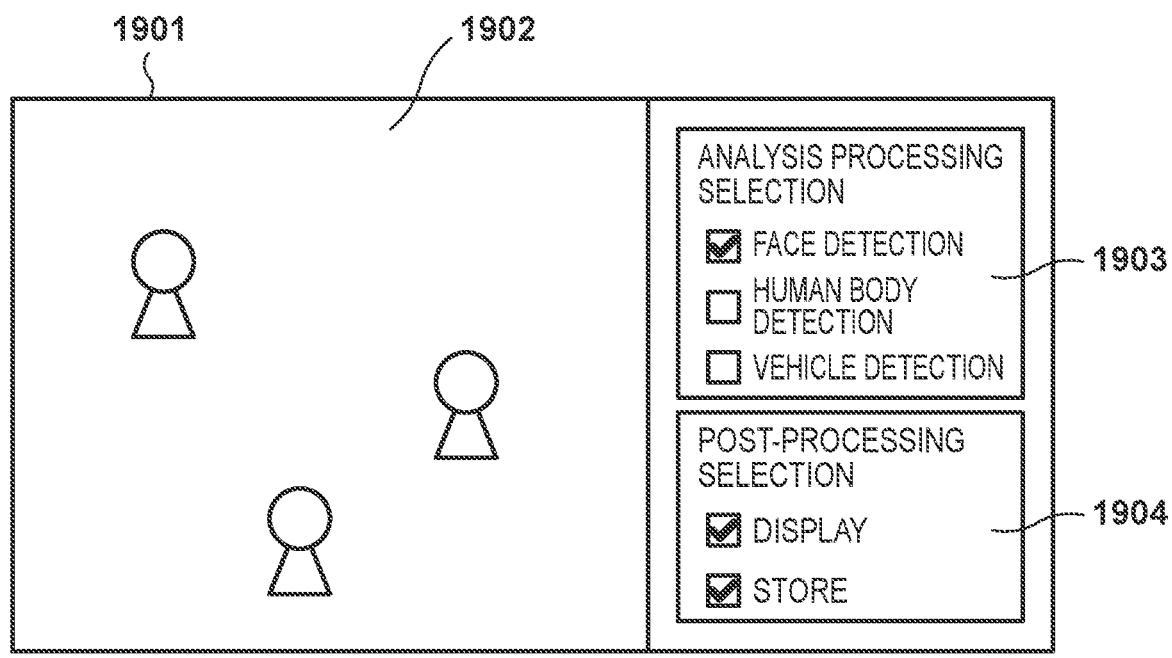
FIG. 19 is a view showing an example of a user interface.

Examples of presentation of a captured image, an integrated processing list, and post-processing list to the user and a method of accepting user selection will be described. FIG. 19 shows an example of screen display of a captured image, an integrated processing list, and a post-processing list via the display unit 703. By the display screen, for example, a user interface 1901 is displayed. The user interface 1901 includes, for example, a captured image display area 1902, an integrated processing list display area 1903, and a post-processing list display area 1904. The user confirms these areas, thereby ascertaining the captured image, the integrated processing list, and the post-processing list.

Note that the list to be displayed is not limited to only the integrated processing list. For example, the image capturing apparatus 110 can store a second processing list for a certain detachable device 100 in the storage unit 303 and transmit the second processing list stored in the storage unit 303 to the input/output apparatus 130 even if the detachable device 100 is not mounted. That is, the image capturing apparatus 110 may output the second processing list for the detachable device 100 mounted in the past. In this case, the input/output apparatus 130 can display analysis processing that is included in the second processing list but not in the integrated processing list in a gray-out state as analysis processing that is enabled by mounting the detachable device 100. It is therefore possible to promote the user to mount the detachable device 100 in the image capturing apparatus 110 to make the processing in the gray-out state executable. Additionally, for example, if the image capturing apparatus 110 and the detachable device 100 have identical processing functions, these can be integrated and displayed as one process. In this case, the image capturing apparatus 110 can determine which one of the image capturing apparatus 110 and the detachable device 100 executes the processing. This determination method will be described later.

Note that the input/output apparatus 130 may display analysis processing and post-processing displayed for the user such that the user can identify which one of the image capturing apparatus 110 and the detachable device 100 should perform each processing. For example, when creating an integrated processing list, the image capturing apparatus 110 makes the integrated processing list include information representing which one of the first processing list and the second processing list includes each analysis processing included in the integrated processing list. In accordance with the information representing which one of the first processing list and the second processing list includes each analysis processing included in the integrated processing list, the input/output apparatus 130 displays each analysis processing while changing the character color. This allows the user to confirm whether each processing is processing executable even if the detachable device 100 is removed. Note that if the image capturing apparatus 110 and the detachable device 100 can execute identical processes, and these are integrated and displayed as one process, this process can be displayed in a character color corresponding to the image capturing apparatus 110. This is because the process can be executed even if the detachable device 100 is removed. However, the present invention is not limited to this, and processing may be displayed in a character color representing that it is processing executable by both the image capturing apparatus 110 and the detachable device 100.

In addition, if processing that is executable when the image capturing apparatus 110 and the detachable device 100 cooperate is included in the integrated processing list, for the processing, information representing the necessity of cooperation may be included in the integrated processing list. In this case, processing implemented when the image capturing apparatus 110 and the detachable device 100 cooperate may be displayed in a still another character color. For example, face authentication processing can be implemented by a function group of a face detection processing function, a face characteristic extraction processing function, and a face characteristic collation processing function. It is assumed that the image capturing apparatus 110 has the face detection processing function and the face characteristic extraction processing function, and the detachable device 100 has the face characteristic collation processing function. In this case, on the user interface 1901, for example, the face detection processing and the face characteristic extraction processing are displayed by blue characters, the face characteristic collation processing is displayed by red characters, and the face authentication processing is displayed by green characters.

Note that changing the character color is merely a form configured to display the functions such that which one of the image capturing apparatus 110 and the detachable device 100 should execute the functions or whether a function is executed by cooperation of these can be distinguished. Such distinguishable display may be done by another form. For example, the execution constituent of processing may explicitly be displayed by changing the background color of each processing. In addition, the difference of the execution constituent may be indicated by a character string. For example, a character string indicating the image capturing apparatus 110 can be added after a character string indicating processing to be executed by the image capturing apparatus 110, and a character string indicating the detachable device 100 can be added after a character string indicating processing to be executed by the detachable device 100. To a character string indicating processing implemented by cooperation of the image capturing apparatus 110 and the detachable device 100, a character string indicating cooperation of the image capturing apparatus 110 and the detachable device 100 can be added. As described above, the image capturing apparatus 110 provides, to the input/output apparatus 130, information representing processes included in the first processing list and processes included in the second processing list in a distinguishable manner, thereby causing the display unit 703 of the input/output apparatus 130 to display the execution constituent of each process in a distinguishable manner. Even if the image capturing apparatus 110 includes a display unit, the execution constituent of each process can be displayed in a distinguishable manner by preparing information representing processes included in the first processing list and processes included in the second processing list in a distinguishable manner. That is, by outputting the information representing processes included in the first processing list and processes included in the second processing list in a distinguishable manner, the image capturing apparatus 110 can cause an arbitrary display device to display the execution constituent of each process in a distinguishable manner.

The user can select execution target processing from the integrated processing list displayed in the integrated processing list display area 1903 of the user interface 1901 via the operation unit 704. In addition, the user can select execution target post-processing from the processing list displayed in the post-processing list display area 1904 via the operation unit 704. For example, FIG. 19 shows an example in which the user selects "face detection" processing as execution target analysis processing, and selects "display" and "storage" as execution target post-processing. Note that in this embodiment, an example in which only one execution target processing is selected is shown. However, the present invention is not limited to this. The system may be configured to allow the user to select a plurality of execution target processes. For example, in addition to "face detection", at least one of "human body detection" and "vehicle detection" may be selected. If one process is selected, selection of another process may be inhibited. As an example, if "human body detection" is selected in a state in which "face detection" is selected in the integrated processing list display area 1903 shown in FIG. 19, selection of "face detection" may be canceled. FIG. 19 shows an example in which both of two post-processes are selected. However, only one of them may be selectable.

Based on the selection of execution target processing and post-processing by the user, the image capturing apparatus 110 is notified of the selection result in step S1007 of FIG. 10. In addition, the control unit 702 of the input/output apparatus 130 may confirm the state of user selection for every predetermined period and notify the image capturing apparatus 110 of execution target processing depending on which processing is selected as the execution target. That is, the processes of steps S1005 to S1007 may periodically be executed, or selection in steps S1005 and S1006 may always be monitored, and the process of step S1007 may be executed when the selection state has changed.

Figure 20:
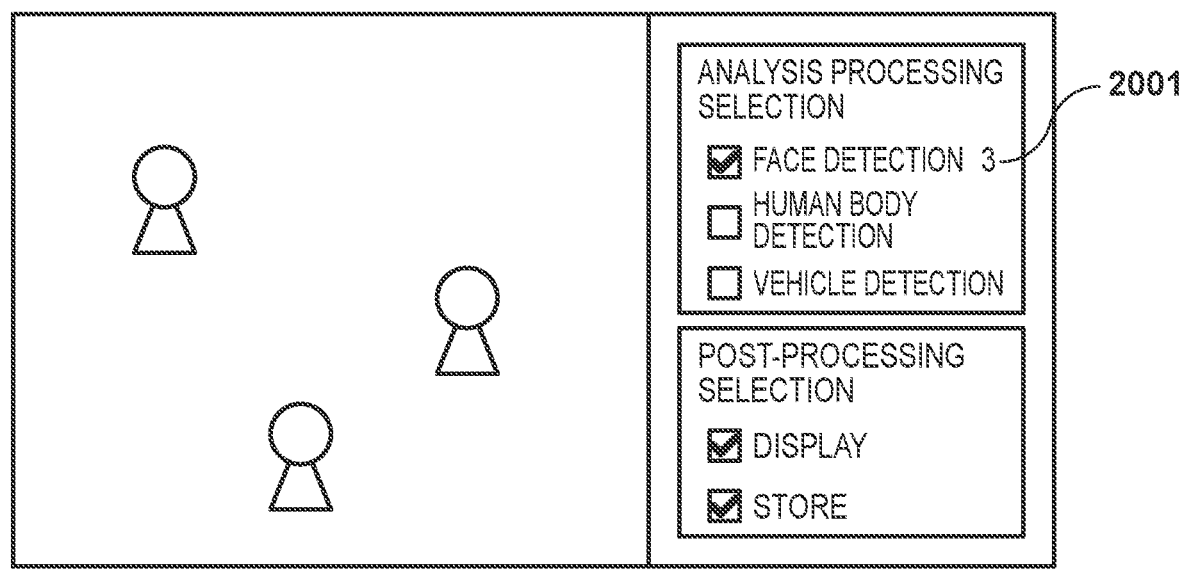
FIG. 20 is a view showing an example of the user interface in a state in which a processing result is shown.

FIG. 20 shows an example of a method of displaying information in step S1203 in a case in which "face detection" is selected as the execution target processing, and "display" is selected as the execution target post-processing. In this example, the number 2001 of persons detected by face detection processing is displayed as the result of analysis processing on the screen of the user interface 1901 shown in FIG. 19. Note that FIG. 20 is merely an example, and the result of processing may be displayed separately from the user interface 1901, and the result of processing may be displayed in another area of the user interface 1901.

In addition, a priority may be set for each of the execution target processing and post-processing selected by the user. For example, if a plurality of execution target processes exist, and priorities are set, the control unit 304 of the image capturing apparatus 110 executes processing (for example, the processes of steps S1103 to SI 107) shown in FIG. 11 for each execution target process in the order of priorities. Note that the calculation resource or network resource on the side of the image capturing apparatus 110 may be assigned based on the priority. For example, a process of high priority may be executed for a video for every first predetermined number of frames, and a process of low priority may be executed for the video for every second predetermined number of frames, which is larger than the first predetermined number of frames. That is, the frequency of executing processing may be determined by priority. In addition, the frequency of transmitting the result of processing of high priority to the input/output apparatus 130 may be higher than the frequency of transmitting the result of processing of low priority to the input/output apparatus 130.

(Processing of Determining Processing Allocation Between Image Capturing Apparatus and Detachable Device)

Figure 21:
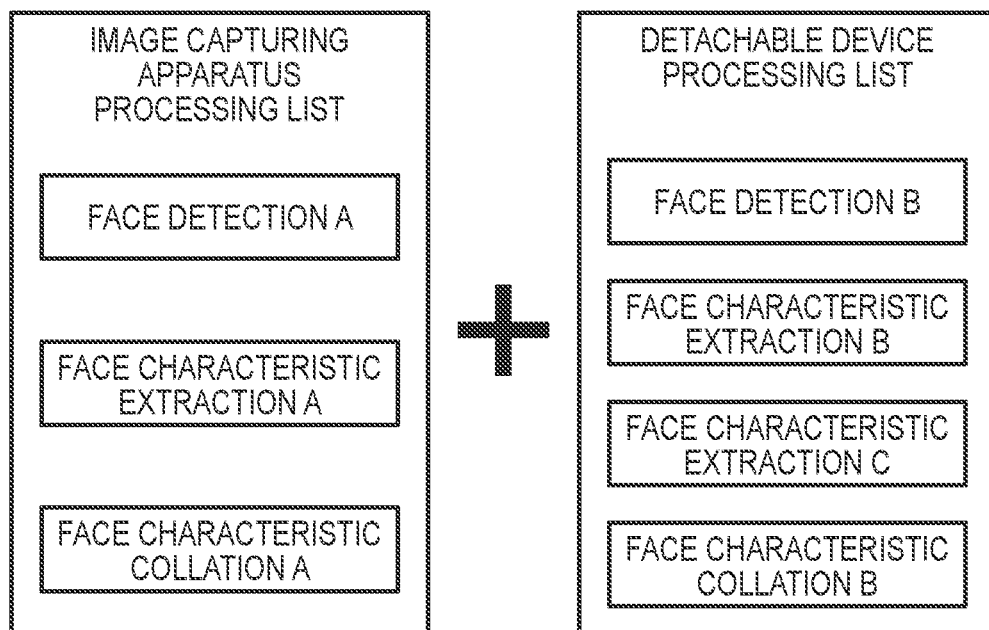
FIG. 21 is a view schematically showing an image analysis processing group for face authentication processing and a processing group executable in each apparatus.

When a plurality of processes are combined, a predetermined process may become executable. For example, face authentication processing can be executed by combining three processes, that is, face detection processing, face characteristic extraction processing, and face characteristic collation processing. If the image capturing apparatus 110 and the detachable device 100 can execute at least one of the three processes, the processes can be allocated between the apparatuses and executed. Additionally, in the image capturing apparatus 110 and the detachable device 100, for example, for at least one of the three processes described above, different processing functions suitable for each condition such as a condition (for example, an image capturing condition) under which data as the processing target is obtained or an analysis target can be prepared. For example, different processing functions may be prepared for processing for an image captured in daytime and processing for an image captured in nighttime. For example, as shown in FIG. 21, the image capturing apparatus 110 and the detachable device 100 are configured to have the face detection processing function, the face characteristic extraction processing function, and the face characteristic collation processing function and execute face authentication processing. Note that even if the image capturing apparatus 110 and the detachable device 100 have the same functions, suitable conditions to use them can be different. In addition, each of the image capturing apparatus 110 and the detachable device 100 may have a plurality of processing functions capable of executing similar processes, like the detachable device 100 shown in FIG. 21, which has two face characteristic extraction processing functions. Accordingly, when processing is appropriately allocated between the image capturing apparatus 110 and the detachable device 100, processing suitable for various conditions can be executed.

Note that even if the image capturing apparatus 110 and the detachable device 100 perform the same processing, advantages and disadvantages occur because of the difference in the arrangement. For example, concerning the operation accuracy, the arithmetic processing unit 203 of the image capturing apparatus 110 can be advantageous because the bit width with respect to data is large. Concerning the operation speed, the detachable device 100 can be advantageous because the operation is performed by the logic circuit on the FPGA 402. If there exist a plurality of processing functions capable of executing the same processing, it is advantageous to select an appropriate processing function based on the environment of image capturing of the image capturing apparatus 110. Considering such circumstances, if the detachable device 100 has a processing function, it is important to appropriately determine whether to actually use the processing function and appropriately select a processing function to be used. Hence, a method of automatically selecting whether to cause the detachable device 100 to execute processing, whether to cause the image capturing apparatus 110 to execute processing, or whether to cause the image capturing apparatus 110 and the detachable device 100 to cooperatively execute processing will be described below. In addition, a method of automatically selecting a processing function to be used by, for example, determining which one of a plurality of processing functions should be used in a case in which the image capturing apparatus 110 and the detachable device 100 have a plurality of processing functions capable of executing the same processing will also be described. Note that three processing examples will individually be described below, and these may be used in combination.

First Processing Example

The first processing example of selecting a processing function to be used will be described with reference to FIG. 22. In this example, to satisfy performance necessary for performing image analysis processing, a processing function to be used is selected from processing functions provided in the image capturing apparatus 110 and the detachable device 100. For example, this processing can be executed in a case in which there is a condition that, for example, processing needs to be performed at a predetermined frame rate or higher, and both the image capturing apparatus 110 and the detachable device 100 can execute the same processing.

In this processing, first, the user selects execution target processing via, for example, the user interface 1901 shown in FIG. 19 on the input/output apparatus 130 (step S2201). Based on the user selection, the control unit 702 of the input/output apparatus 130 transmits an execution instruction command for the execution target processing to the image capturing apparatus 110. The control unit 304 of the image capturing apparatus 110 obtains the execution instruction command representing the selected process from the input/output apparatus 130. Note that if the image capturing apparatus 110 has an information presentation function of presenting executable processing and an operation acceptance function of causing the user to make a selection, the user may directly operate the image capturing apparatus 110 and instruct the execution target processing to the control unit 304 of the image capturing apparatus 110.

The control unit 304 of the image capturing apparatus 110 confirms processing performance needed when executing the selected processing (step S2202). As for the setting of the processing performance, a set value may be determined in advance for each processing, or the user may set a target value when selecting processing. The control unit 304 executes, in the image capturing apparatus 110, the processing selected in step S2201 (step S2203). Note that this processing can be executed in parallel to image capturing. In addition, a function that exists only in the detachable device 100 in the processing functions to be used when executing the selected processing is executed by the detachable device 100 but not executed in the image capturing apparatus 110.

During execution of the processing of after completion of processing of a predetermined amount of data, the control unit 304 confirms whether the executed processing satisfies the processing performance set in step S2202 (step S2204). Upon confirming that the processing performance is satisfied (YES in step S2204), the control unit 304 returns the process to step S2203 to directly continue the processing. On the other hand, upon confirming that the processing performance is not satisfied (NO in step S2204), the control unit 304 advances the process to step S2205 to attempt a change to a processing allocation capable of satisfying the processing performance.

In step S2205, concerning processing that is a part of the processing executed by the image capturing apparatus 110 and is executable even in the detachable device 100, the execution constituent is changed to the detachable device 100. Since processes executable by the detachable device 100 are ascertained, the control unit 304 of the image capturing apparatus 110 selects processing to be transferred to the detachable device 100 from the list (second processing list) of processes and changes the execution constituent of the processing. When the change is completed, the processing selected in step S2201 is allocated to the control unit 304 and the analysis unit 501 and executed (step S2206). After that, the control unit 304 confirms whether to return the processing function from the detachable device 100 to the image capturing apparatus 110 (step S2207). When the processing is returned to the image capturing apparatus 110, the processing can be executed at a higher operation accuracy.

If, for example, the reason why it is determined in step S2204 that the processing performance cannot be satisfied is a temporary high load state or the like, and the state is eliminated, the control unit 304 can determine that the process can be returned to the image capturing apparatus 110. That is, the control unit 304 can determine, based on the processing load of the image capturing apparatus 110, which one of the image capturing apparatus 110 and the detachable device 100 should execute the processing. Note that in addition to causing the detachable device 100 to execute processing in a state in which the processing load of the image capturing apparatus 110 is high, as described above, the image capturing apparatus 110 may be caused to execute processing in a state in which the processing load of the detachable device 100 is high. That is, which one of the image capturing apparatus 110 and the detachable device 100 should execute processing may be determined based on the processing load of the detachable device 100.

Additionally, if, for example, the target value of the processing performance is lowered by the user, the control unit 304 can determine that the processing can be returned to the image capturing apparatus 110. Upon determining to return the processing to the image capturing apparatus 110 (YES in step S2207), the control unit 304 changes the execution constituent of the part of the processing, which has been executed by the detachable device 100, to the image capturing apparatus 110 (step S2208). Note that the processing whose execution constituent is returned to the image capturing apparatus 110 in step S2208 may be a part or whole of the processing whose execution constituent was changed to the detachable device 100 in step S2205. After the execution constituent of at least the part of the processing is returned to the image capturing apparatus 110, the control unit 304 returns the process to step S2203. On the other hand, upon determining not to return the processing to the image capturing apparatus 110 (NO in step S2207), the control unit 304 returns the process to step S2206 and continues the processing without changing the processing allocation.

Note that in a case in which the detachable device 100 has a plurality of processing functions capable of executing the same processing, if the processing performance cannot be satisfied after the execution constituent of the part of the processing is transferred to the detachable device 100, the processing function may be switched to the processing function for executing the same function. That is, in step S2207, instead of switching the execution constituent of the processing, the processing function to be used may be changed while keeping the detachable device 100 as the execution constituent.

In addition, even after the execution constituent of the part of the processing is transferred to the detachable device 100, if the processing performance confirmed in step S2202 cannot be satisfied, the control unit 304 may return the execution constituent of the processing to the image capturing apparatus 110. At this time, the control unit 304 can store information representing the processing performance confirmed in step S2202 as the information of the processing performance that cannot be satisfied by the current mounted detachable device 100. If similar processing performance or stricter processing performance is required, the control unit 304 may not cause the detachable device 100 to execute the processing. Similarly, for example, even in a situation in which the processing load of the image capturing apparatus 110 is sufficiently small, if the processing performance confirmed in step S2202 cannot be satisfied, the information of the processing performance may be stored. In this case, in the subsequent processing, if the stored processing performance or stricter processing performance is confirmed in step S2202, the control unit 304 may transfer the execution constituent of a part of the processing on the detachable device 100 without executing the process of step S2203.

According to the first processing example, processing functions provided in the image capturing apparatus 110 and the detachable device 100 are selected, and processing is allocated between the apparatuses and executed to satisfy required processing performance. This makes it possible to perform appropriate processing allocation in accordance with, for example, the state of the image capturing apparatus 110 and maintain satisfactory processing performance.

Second Processing Example

The second processing example of selecting a processing function to be used will be described next with reference to FIG. 23. This processing is executed when selecting a processing function to be used in a case in which the detachable device 100 has a plurality of processing functions capable of executing the same processing. Note that this processing can be executed in a case in which, for example, it is determined to cause the detachable device 100 to execute some processes in the first processing example. That is, when the detachable device 100 executes processing, this processing can be used by the detachable device 100 to determine which one of one or more processing functions capable of executing the processing should be used. However, this is merely an example, and processing allocation between the image capturing apparatus 110 and the detachable device 100 may be determined by this processing example. For example, if a plurality of processing functions capable of executing the same processing exist in an integrated processing list in which processes executable by the image capturing apparatus 110 and the detachable device 100 are integrated, this processing example may be used to determine which one of the processing functions should be used. That is, if each of the image capturing apparatus 110 and the detachable device 100 has one or more processing functions capable of executing the same processing, this processing example can be used to determine which processing function should be used to execute process in which apparatus.

Figure 22:
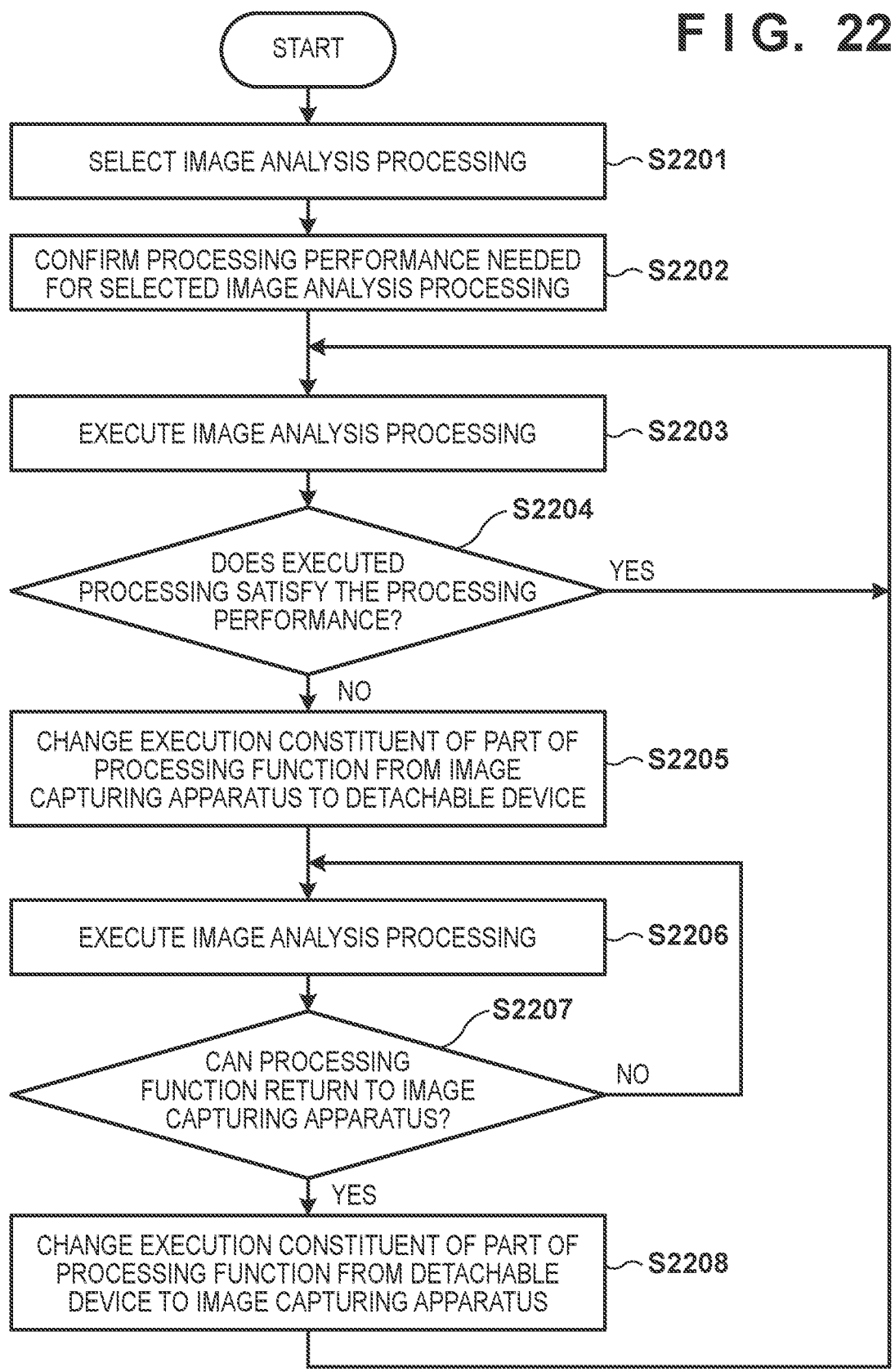
FIG. 22 is a flowchart showing an example of the procedure of selection processing of a processing function to be used.

In this processing, first, as in step S2201 of FIG. 22, the user selects execution target processing on the input/output apparatus 130, and the control unit 304 of the image capturing apparatus 110 obtains information representing the selected processing from the input/output apparatus 130 (step S2301). The control unit 304 confirms the list (second processing list) of processes executable by the detachable device 100, and confirms, for the execution target processing, whether a plurality of processing functions capable of executing the same processing exist (step S2302). Upon determining that only one processing function capable of executing the execution target processing exists (NO in step S2302), the control unit 304 executes the processing using the processing function (step S2303). On the other hand, upon determining that a plurality of processing functions capable of executing the execution target processing exist (YES in step S2302), the control unit 304 advances the process to step S2304 to execute the processing using one of the plurality of processing functions.

In step S2304, the control unit 304 confirms the characteristic of each of the plurality of processing functions capable of executing the same processing that is the determination target of step S2302. Here, concerning, for example, face characteristic extraction, characteristics representing that a first processing function is suitable for processing an image of a relatively high brightness in daytime and a second processing function is suitable for processing an image of a relatively low brightness in nighttime are confirmed. After the difference between the characteristics of the processing functions is confirmed, the control unit 304 confirms the current environment in which the image capturing apparatus 110 is performing image capturing (step S2305). Based on the characteristic of each processing function obtained in step S2304 and the information of the image capturing environment obtain in step S2305, the control unit 304 selects a processing function to be used in actual analysis processing (step S2306), and executes analysis processing using the selected processing function (step S2307).

Here, the confirmation of the image capturing environment can be done based on, for example, the internal clock of the image capturing apparatus 110 or the distribution of brightness values of an image captured by the image capturing apparatus 110. For example, if the internal clock indicates a nighttime zone, a processing function suitable for processing an image of a relatively low brightness value is selected. If the brightness values of the captured image localize on the low brightness side, a processing function suitable for processing an image of a relatively low brightness value is selected. Alternatively, the distribution of evaluation values of detection accuracy for a brightness value may be prepared for each processing function and, for example, a processing function for which the sum of values obtained by multiplying and adding the frequency of each brightness value of a captured image and a value indicating the detection accuracy of the brightness value is most excellent may be selected. The confirmation of the image capturing environment may be done based on, for example, the information of the angle of view (pan/tilt/zoom) at the time of image capturing of the image capturing apparatus 110. For example, a processing function to be used is selected based on, for example, which one of a dark area in a room or a bright area by a window is captured. Note that the characteristic of a processing function may be defined by an index other than the brightness value. For example, various characteristics such as a high face extraction accuracy in an image including a predetermined object such as a window or a high detection accuracy for an object that is moving at a high speed can be used as the reference of selection of a processing function to be used. Additionally, for example, each processing function may have a characteristic representing that processing is performed at a high speed but at a low accuracy or a characteristic representing that processing is performed relatively at a low speed but at a high accuracy. A suitable processing function may be selected in accordance with a processing condition.

The control unit 304 confirms whether the image capturing environment has changed (step S2308). If the image capturing environment has changed (YES in step S2308), the control unit 304 executes the processing of selecting a processing function suitable for the environment after the change again (step S2306), and executes analysis processing by the selected processing function (step S2307). On the other hand, if the image capturing environment has not changed (NO in step S2308), the control unit 304 continues analysis processing without changing the processing function (step S2307).

According to this processing, it is possible to select a processing function suitable for the environment from a plurality of processing functions capable of executing the same processing and use the processing function. This makes it possible to selectively use an appropriate processing function for each environment from the viewpoint of accuracy of processing or the like.

Third Processing Example

Figure 24:
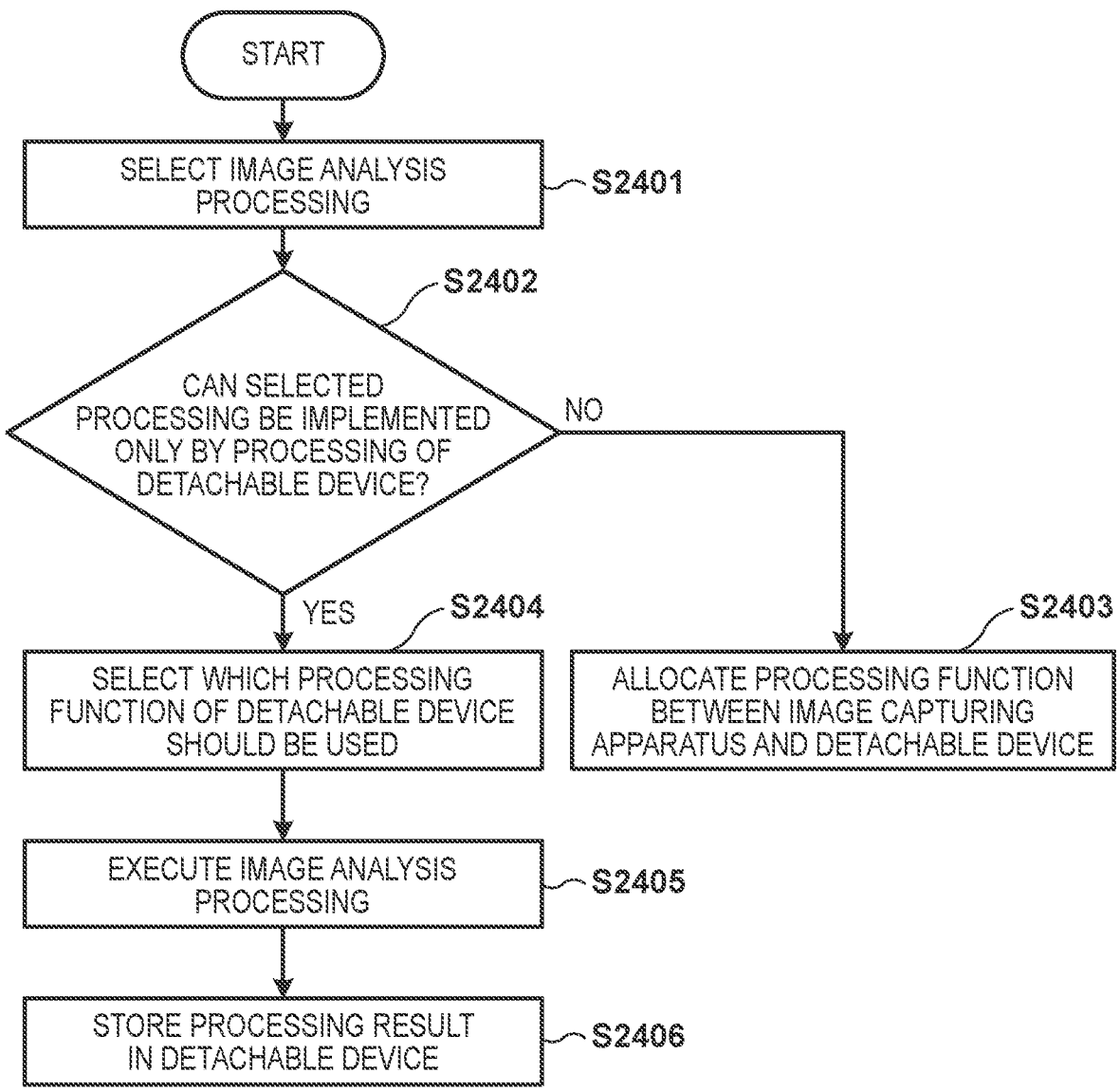
FIG. 24 is a flowchart showing an example of the procedure of selection processing of a processing function to be used.

The third processing example of determining allocation of processing between the image capturing apparatus 110 and the detachable device 100 will be described next with reference to FIG. 24. In this processing, allocation of processing is determined based on whether processing can be completed only by the combination of processing functions provided in the detachable device 100.

Figure 23:
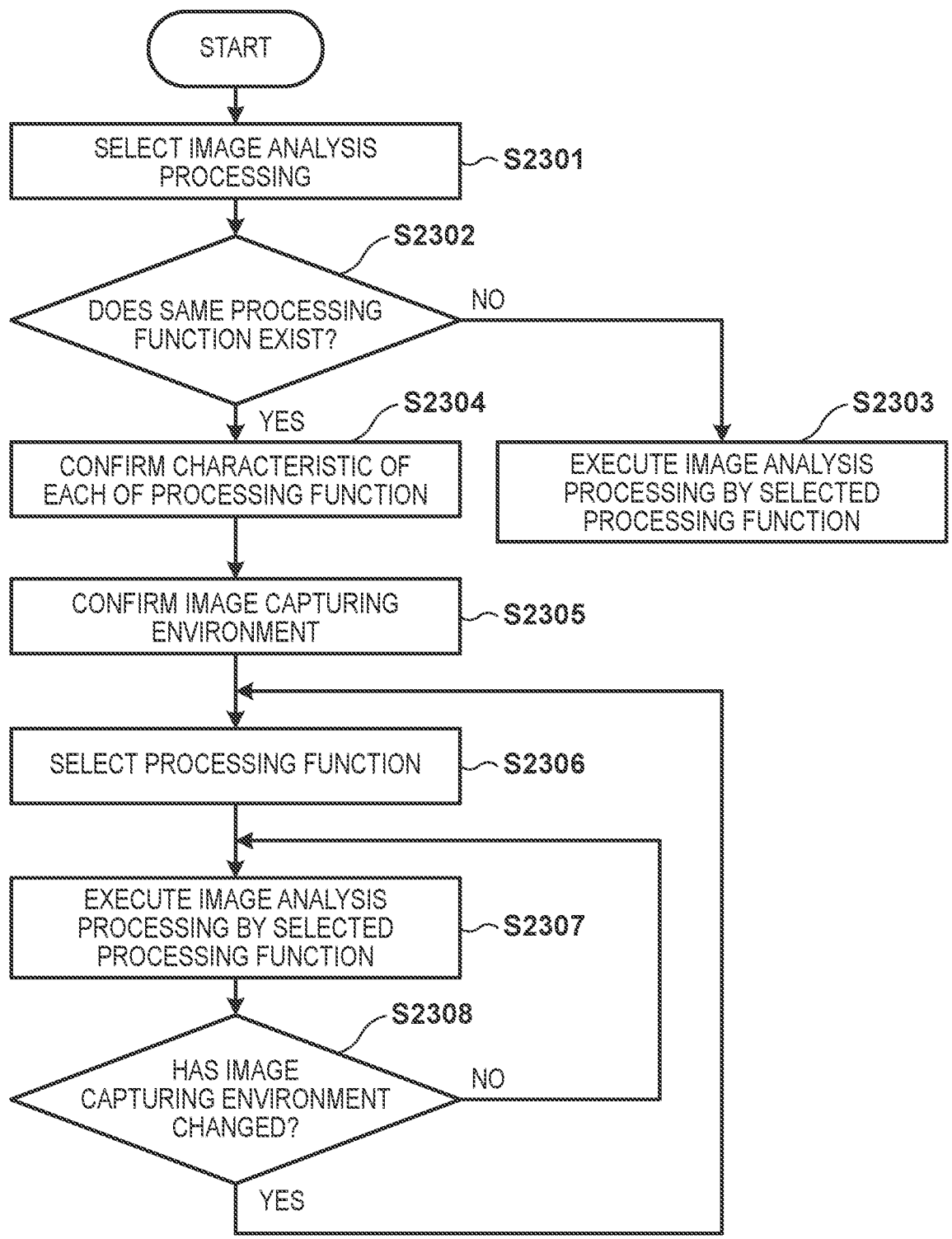
FIG. 23 is a flowchart showing an example of the procedure of selection processing of a processing function to be used.

In this processing, first, as in step S2201 of FIG. 22 or step S2301 of FIG. 23, the user selects execution target processing on the input/output apparatus 130, and the control unit 304 of the image capturing apparatus 110 obtains information representing the selected processing from the input/output apparatus 130 (step S2401). The control unit 304 determines whether the selected processing can be implemented (completed) only by the detachable device 100 (step S2402). Note that the control unit 304 can perform the determination of step S2402 based on, for example, whether all functions of the selected processing can be satisfied by the combinations of processing functions provided in the detachable device 100 or whether a processing result can be stored in the detachable device 100. For example, if all functions of the selected processing can be satisfied by the combinations of the processing functions provided in the detachable device 100, and the processing result can be stored in the detachable device 100, the control unit 304 determines that the processing can be completed only by the detachable device 100.

Upon determining that the selected processing cannot be completed only by the detachable device 100 (NO in step S2402), the control unit 304 allocates the processing between the image capturing apparatus 110 and the detachable device 100 (step S2403). In this case, processing allocation in the first processing example and the second processing example can be performed. Note that in this case, all processes may be executed by the image capturing apparatus 110, that is, use of the processing functions of the detachable device 100 may be inhibited. On the other hand, upon determining that the selected processing can be completed only by the detachable device 100 (YES in step S2402), the control unit 304 selects which processing function of the processing functions provided in the detachable device 100 should be used (step S2404). Note that if the detachable device 100 has a plurality of processing functions capable of executing the same processing, which processing function should be used is selected as in the second processing example. After that, the control unit 304 executes processing of causing the detachable device 100 to execute image analysis processing using the selected processing function (step S2405). In addition, the control unit 304 executes processing of storing, in the detachable device 100, the result of performing image analysis processing in step S2405 (step S2406). These processes are executed using, for example, commands of the SD standard. Note that in step S2406, the result may be stored in the storage unit 404, or if a RAM is provided in the FPGA 402, the result may be stored in the RAM.

In this processing example, if processing can be completed in the detachable device 100, the detachable device 100 is caused to execute the processing. Accordingly, processing to be executed by the image capturing apparatus 110 is only image transmission to the detachable device 100, and the processing load can greatly be reduced.

In the above-described way, functions executable on the side of the image capturing apparatus 110 are increased using the detachable device 100, thereby enhancing processing functions in the system. For example, when a latest processing function is implemented in the detachable device 100, image analysis processing by the latest processing function can be executed on the side of the image capturing apparatus 110 without replacing the image capturing apparatus 110. This can flexibly operate the system and improve the convenience.

(Processing of Obtaining Communication Specifications)

Figure 25:
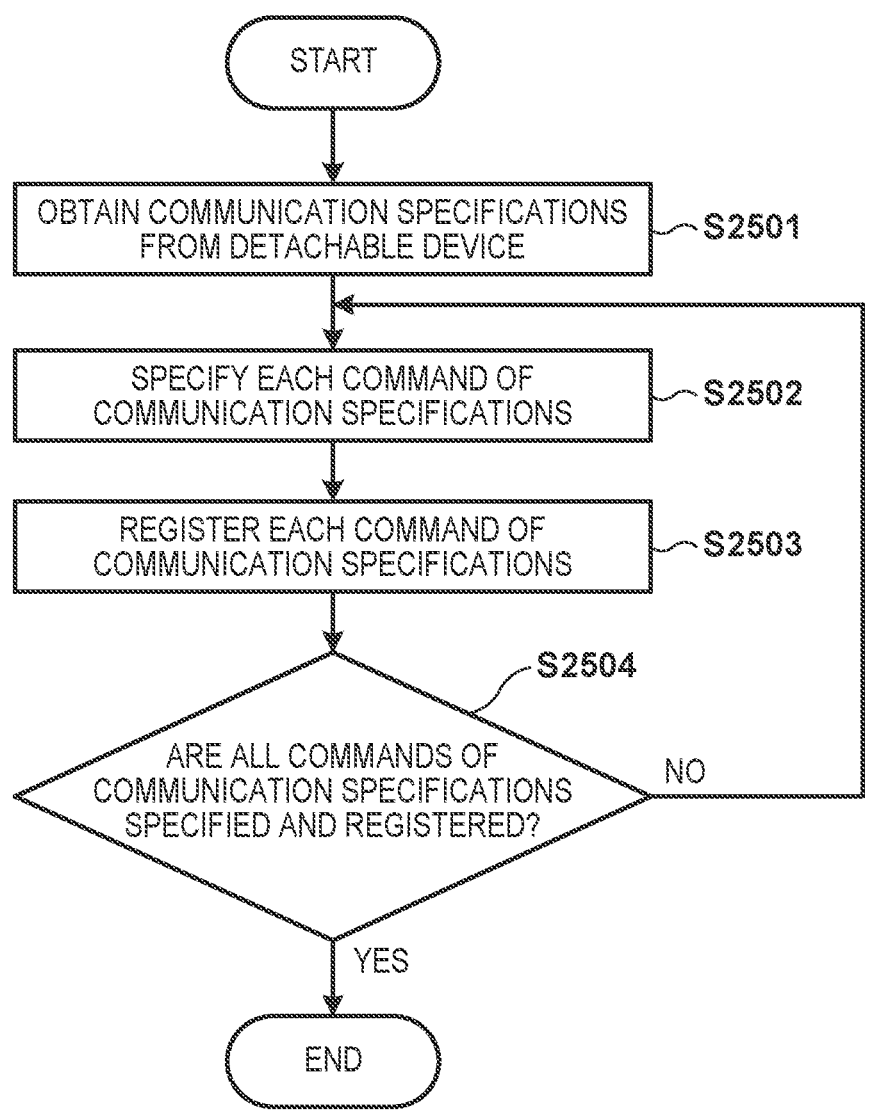
FIG. 25 is a flowchart showing the procedure of processing of obtaining the information of communication specifications.

FIG. 25 shows an example of the procedure of processing of the image capturing apparatus 110 to obtain, from the detachable device 100, communication specifications used to perform communication complying with an existing predetermined communication standard with the detachable device 100. This processing corresponds to a part of the processing of step S802 shown in FIG. 8. Note that in the following description, the communication specifications obtained by the image capturing apparatus 110 are stored in the storage unit 404. However, the communication specifications may be stored in a storage area separately prepared in the detachable device 100.

First, the control unit 304 of the image capturing apparatus 110 controls the device communication unit 306 to issue, to the mounted device, a read request (read command) to a specified address at which the communication specifications are stored. The image capturing apparatus 110 receives a response to the request, thereby obtaining the information of communication specifications stored at the specific address (step S2501). Note that the communication specifications read request can be done using, for example, a general-purpose read command that need not separately be defined. However, the command is not limited to this, and a command defined exclusively for read of communication specifications may be used.

Next, the control unit 304 specifies one or more commands included in the obtained information of communication specifications and processing contents corresponding to the commands (step S2502). FIG. 26 shows an example of commands included in the information of communication specifications and processing contents corresponding to the commands. In an example, if the information of communication specifications is configured as shown in FIG. 26, the control unit 304 reads "processing contents", "number of commands", and combinations of "command numbers" and "command arguments" according to the number of commands. The number of commands represents the number of commands to be transmitted for corresponding processing contents. For example, in "image analysis processing execution", since the number of commands is "1", an instruction concerning image analysis processing execution is completed by transmitting one command. On the other hand, in "processing function selection", since the number of commands is "2", an instruction concerning processing function selection is not completed until two commands are transmitted.

In FIG. 26, the values "1" and "2" associated with the combination of the "command number" and the "command argument" each indicate the order of a command sequence transmitted in correspondence with each processing. That is, the "command number" and the "command argument" associated with the value "1" indicate information about the first command transmitted/received first concerning corresponding processing. In addition, the "command number" and the "command argument" associated with the value "2" indicate information about the second command transmitted/received concerning corresponding processing. For example, the "command number" associated with the value "1" concerning "image analysis processing execution" is "23", and the "command argument" is "A". In "image analysis processing execution", since the number of commands is 1, a "command number" and a "command argument" associated with the value "2" do not exist. For this reason, the control unit 304 transmits a command in which "23" is stored in the command number part 1304, and "A" is stored in the command argument part 1305 to the detachable device 100, thereby instructing the detachable device 100 to execute image analysis processing. In addition, the "command number" associated with the value "1" concerning "processing function selection" is "39", and the "command argument" is "B". The "command number" associated with the value "2" is "31", and the "command argument" is an address value. The address value is an address used to designate an area where the configuration of the processing function to be selected is stored in the storage unit 404. In "processing function selection", since the number of commands is 2, "command numbers" and "command arguments" associated with values from the value "3" (not shown) do not exist. For this reason, a command sequence formed by the above-described two commands is used as the selection commands for the processing function to be executed in the detachable device 100. Note that the "processing function selection" command can be used when, for example, the detachable device 100 has a plurality of image analysis processing functions, and one of them can selectively be used.

Referring back to FIG. 25, the control unit 304 registers each command and processing contents corresponding to the commands in the device communication unit 306 (step S2503). The control unit 304 determines, for all commands included in the information of communication specifications, whether specifying and registration of processing contents corresponding to the commands are completed (step S2504). Upon determining that specifying and registration for all the commands included in the information of communication specifications are not completed (NO in step S2504), the control unit 304 returns to step S2502 to continue specifying and registration of commands. On the other hand, upon determining that specifying and registration for all the commands included in the information of communication specifications are completed (YES in step S2504), the control unit 304 ends the processing.

When communicating with the detachable device 100 via the device communication unit 306, the image capturing apparatus 110 executes communication based on the communication specifications registered by the processing shown in FIG. 25. For example, to instruct the detachable device 100 to execute image analysis processing, the image capturing apparatus 110 issues a command in which "23" is included in the command number part 1304, and "A" is included in the command argument part 1305.

Note that here, the information of communication specifications includes processing contents, the number of commands, and combinations of command numbers and command arguments according to the number of commands. However, the present invention is not limited to this. For example, the information of communication specifications can be configured in accordance with a predetermined standard used for communication. For example, if a command argument does not exist in the predetermined standard, the information of communication specifications includes command numbers corresponding to the number of commands but need not include the information of command arguments. In addition, the information of communication specifications may include command specifications other than the command structure defined by the predetermined standard. For example, if a command requires waiting for a predetermined time after issuance of the command, the information of communication specifications may include a wait time after the command issuance. Also, in the predetermined standard, using an existing command number associated with another general-purpose processing, a definition of communication specifications for performing specific processing may be included in the information of communication specifications. The information of communication specifications can be definition information that makes it possible to execute various kinds of communications that are not defined in the predetermined standard (version) with which the image capturing apparatus 110 complies.

In the above-described way, the image capturing apparatus 110 receives, from the detachable device 100, the information of communication specifications used to perform predetermined communication with the detachable device 100 in accordance with the existing communication standard. Here, as the information of communication specifications, definition information of a command added when the existing communication standard is upgraded or a locally added new command can be included. Hence, the image capturing apparatus 110 can perform communication using the newly added command by a mode complying with the conventional standard without updating software. The above-described example shows an example in which a new command is defined for predetermined communication concerning the image analysis processing function held by the detachable device 100. That is, a case in which the message of the mode of the conventional standard is locally defined to make communication suitable for the detachable device 100 executable by the mode complying with the conventional standard has been described. However, the present invention is not limited to this. For example, when the detachable device 100 is caused to hold the information of a protocol newly defined by the SD standard as the information of communication specifications, the new command can be used by the image capturing apparatus 110. Note that without needing to know whether commands and the like defined by the received information of communication specifications are locally defined, the image capturing apparatus 110 can use the communication specifications for communication with the detachable device 100. Note that, for example, every time the information of communication specifications is received, the image capturing apparatus 110 may delete the information of communication specifications held so far. This can prevent locally defined communication specifications from being erroneously used for another device. In addition, the image capturing apparatus 110 may store the information of communication specifications and the identification information of the detachable device 100 in association with each other. When a device is mounted, the image capturing apparatus 110 can obtain the identification information of the device and use communication specifications associated with the device unless the information of communication specifications is newly obtained from the device. By the above way, if the communication specifications of the detachable device 100 are changed, or a command specific to the detachable device 100 is added, the image capturing apparatus 110 can communicate with the detachable device 100 without changing software.

(Processing of Obtaining Communication Specifications)

The information of communication specifications can be held in the detachable device 100 at an arbitrary timing before execution of the initial sequence of step S802 shown in FIG. 8. On the other hand, the communication specifications need to correspond to the circuit configuration (the input/output control unit 410 and the like) of the FPGA 402. Hence, in this embodiment, the information of communication specifications is provided to the detachable device 100 at a timing when setting data including the information of the logic circuit structure of the FPGA 402 is held in the detachable device 100. Note that the timing when setting data including the information of the logic circuit structure of the FPGA 402 is held in the detachable device 100 can be, for example, the manufacturing stage of the detachable device 100 or a timing when the circuit configuration of the FPGA 402 of the detachable device 100 is changed. Here, setting data including the information of the logic circuit structure is transferred from a PC (not shown) to the detachable device 100. The detachable device 100 can be mounted in the image capturing apparatus 110, for example, after receiving the setting data transferred from the PC, and execute image analysis processing in the above-described way based on the setting data. Note that the PC holds, in advance, the setting data of the FPGA 402 and communication specifications corresponding to a circuit configuration formed by deploying the setting data in the detachable device 100. Note that here, the PC includes a mounting part configured to mount the detachable device 100, and the detachable device 100 is directly mounted in the PC. However, the present invention is not limited to this. The PC may be, for example, connected, via network, to the apparatus in which the detachable device 100 is mounted and communicate with the detachable device 100.

FIG. 27 shows an example of the procedure of processing of the PC to register the information of communication specifications in the detachable device 100. First, the PC transfers setting data including the information of the logic circuit structure to the storage unit 404 of the mounted detachable device 100 (step S2701). Note that at this time, if setting data is already held in the storage unit 404 of the detachable device 100, the held date is overwritten by the setting data transferred from the PC. The PC reads out the information of communication specifications held in the storage unit 404, and compares it with the information of communication specifications corresponding to the setting data transferred in step S2701 (step S2702). Upon determining that the information of communication specifications corresponding to the setting data is held (YES in step S2702), the PC directly ends the processing. On the other hand, upon determining that the information of communication specifications corresponding to the setting data is not held (NO in step S2702), the PC transfers the communication specifications held in the PC to the storage unit 404 (step S2703). Note that if the write speed of the storage unit 404 is high, or there is a margin in the rewrite count limitation, the information of communication specifications may always be transferred without performing the determination in step S2702. Alternatively, the PC may transfer the information of communication specifications without executing the determination in step S2702, and the detachable device 100 may determine whether the held information of communication specifications matches the received information of communication specifications. If these pieces of information do not match, the detachable device 100 may overwrite the received information of communication specifications on the held information.

As described above, by the processing shown in FIG. 27, the information of communication specifications necessary for the image capturing apparatus 110 to communicate with the detachable device 100 can be transferred at the time of transfer of setting data of the FPGA 402. Hence, the information of communication specifications corresponding to the circuit configuration formed by deploying the setting data in the detachable device 100 is held in the detachable device 100, and the detachable device 100 can provide the information of appropriate communication specifications to the image capturing apparatus 110.

In the above-described embodiment, image analysis processing has been described as an example of analysis processing. However, the present invention is also applicable to audio analysis processing. For example, the present invention can be applied to processing of detecting an audio pattern such as a scream, a gunshot, or glass breaking sound. For example, a characteristic amount of an audio is extracted by various audio data analysis methods such as spectrum analysis, and the extracted characteristic amount is compared with the detected audio pattern. By calculating the degree of matching, a specific audio pattern can be detected.

When performing audio analysis processing, audio data is divided into audio data of a predetermined time, audio analysis processing is performed using the audio data of the predetermined time as a unit. In addition, the predetermined time appropriately changes depending on the audio pattern of the detection target. For this reason, audio data of a time corresponding to an audio pattern to be detected is input to the detachable device 100. The detachable device 100 has a function of analyzing the input audio data or a function of holding the input audio data.

In the above-described embodiment, the detachable device 100 capable of non-temporarily storing data input from the image capturing apparatus 110 has been described as an example. However, in some embodiments, the detachable device 100 that cannot non-temporarily store data input from the image capturing apparatus 110 may be used. That is, the detachable device 100 may only perform analysis processing for data input from the image capturing apparatus 110, and need not have the function of non-temporarily storing the data. In other words, the detachable device 100 may not be assumed to be used to store data, like a normal SD card, and may have only the function of analysis processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-061111, filed Mar. 30, 2020 which is hereby incorporated by reference herein in its entirety.

What is claimed is:

1. An image capturing apparatus comprising:
a mounting structure, in which a device capable of holding at least an image captured by the image capturing apparatus is capable of being mounted and via which the image capturing apparatus is capable of communicating with the mounted device in accordance with a predetermined standard;
one or more processors; and
one or more memories that store one or more computer-readable instructions for causing, when executed by the one or more processors, the one or more processors to function as:
an obtaining unit configured to obtain, from the device, information of communication specifications indicative of a command having a form compliant with the predetermined standard and defined as a new command, which is not defined in the predetermined standard supported by the image capturing apparatus, for performing predetermined communication with the device mounted in the mounting structure, wherein the information of communication specifications is defined by the new command for which at least a wait time after issuance of a predetermined command is changed; and
a communication unit configured to perform, using the obtained information of the communication specifications, the predetermined communication with the device mounted in the mounting structure in accordance with the predetermined standard.

2. The apparatus according to claim 1, wherein the predetermined communication includes communication concerning a processing function including image analysis processing by the device mounted in the mounting structure.

3. The apparatus according to claim 1, wherein the predetermined communication includes communication concerning a protocol newly defined in the predetermined standard.

4. The apparatus according to claim 1, wherein the information of the communication specifications includes information that defines one or more commands for each of one or more of the predetermined communications.

5. The apparatus according to claim 1, wherein the obtaining unit obtains the information of the communication specifications from the device mounted in the mounting structure by the communication according to the predetermined standard.

6. The apparatus according to claim 1, wherein the image capturing apparatus complies with a first version of the communication specifications and does not comply with a second version of the communication specifications that is a version after updating the first version of the communication specifications, and wherein the information of communication specifications includes a command that is not defined in the first version of the communication specifications and that is compliant with the second version of the communication specifications.

7. The apparatus according to claim 1, wherein for the new command, in addition to the wait time, at least one of a command number, an argument, or a command sequence is changed.

8. A device mounted in a mounting structure of an image capturing apparatus including the mounting structure, wherein a device capable of holding at least an image captured by the image capturing apparatus is capable of being mounted in the mounting structure and the image capturing apparatus is capable of communicating with the mounted device via the mounting structure in accordance with a predetermined standard, comprising:
one or more processors; and
one or more memories that store one or more computer-readable instructions for causing, when executed by the one or more processors, the one or more processors to function as:
a providing unit configured to provide, to the image capturing apparatus, information of communication specifications indicative of a command having a form compliant with the predetermined standard and defined as a new command, which is not defined in the predetermined standard supported by the image capturing apparatus, for performing predetermined communication with the image capturing apparatus, wherein the information of communication specifications is defined by the new command for which at least a wait time after issuance of a predetermined command is changed; and
a communication unit configured to perform, using the provided information of the communication specifications, the predetermined communication with the image capturing apparatus in accordance with the predetermined standard.

9. The device according to claim 8, wherein the one or more computer-readable instructions causes, when executed by the one or more processors, the one or more processors to function as a processing unit capable of configuring a circuit corresponding to a processing function including image analysis processing.

10. The device according to claim 9, wherein the predetermined communication includes communication concerning the processing function to which the circuit configured by the processing unit corresponds.

11. The device according to claim 9, wherein the one or more computer-readable instructions causes, when executed by the one or more processors, the one or more processors to function as an obtaining unit configured to obtain information concerning setting of a configuration of a circuit of the processing unit and the information of the communication specifications corresponding to the information concerning the setting.

12. The device according to claim 11, wherein the obtaining unit obtains the information of the communication specifications corresponding to the information concerning the setting when obtaining the information concerning the setting.

13. The device according to claim 11, wherein the one or more computer-readable instructions causes, when executed by the one or more processors, the one or more processors to function as a holding unit configured to hold the information concerning the setting and the information of the communication specifications corresponding to the information concerning the setting.

14. The device according to claim 13, wherein the obtaining unit obtains the information of the communication specifications if the information of the communication specifications corresponding to the obtained information concerning the setting is not held in the holding unit.

15. The device according to claim 13, wherein the holding unit can hold an image captured by the image capturing apparatus.

16. The device according to claim 8, wherein the predetermined communication includes communication concerning a protocol newly defined in the predetermined standard.

17. The device according to claim 8, wherein the information of the communication specifications includes information that defines the one or more commands for each of one or more of the predetermined communications.

18. The device according to claim 8, wherein the providing unit provides the information of the communication specifications to the image capturing apparatus by the communication according to the predetermined standard.

19. The device according to claim 8, wherein the image capturing apparatus complies with a first version of the communication specifications and does not comply with a second version of the communication specifications that is a version after updating the first version of the communication specifications, and wherein the information of communication specifications includes a command that is not defined in the first version of the communication specifications and that is compliant with the second version of the communication specifications.

20. The device according to claim 8, wherein for the new command, in addition to the wait time, at least one of a command number, an argument, or a command sequence is changed.

21. A communication method executed by an image capturing apparatus,
wherein the image capturing apparatus includes a mounting structure, in which a device capable of holding at least an image captured by the image capturing apparatus is capable of being mounted and via which the image capturing apparatus is capable of communicating with the mounted device in accordance with a predetermined standard,
wherein the method comprises:
obtaining, from the device, information of communication specifications indicative of a command having a form compliant with the predetermined standard and defined as a new command, which is not defined in the predetermined standard supported by the image capturing apparatus, for performing predetermined communication with the device mounted in the mounting structure, wherein the information of communication specifications is defined by the new command for which at least a wait time after issuance of a predetermined command is changed; and performing, using the obtained information of the communication specifications, the predetermined communication with the device mounted in the mounting structure in accordance with the predetermined standard.

22. A communication method executed by a device mounted in a mounting structure of an image capturing apparatus including the mounting structure, wherein a device capable of holding at least an image captured by the image capturing apparatus is capable of being mounted in the mounting structure and the image capturing apparatus is capable of communicating with the mounted device via the mounting structure in accordance with a predetermined standard, comprising:

providing, to the image capturing apparatus, information of communication specifications indicative of a command having a form compliant with the predetermined standard and defined as a new command, which is not defined in the predetermined standard supported by the image capturing apparatus, for performing predetermined communication with the image capturing apparatus, wherein the information of communication specifications is defined by the new command for which at least a wait time after issuance of a predetermined command is changed; and performing, using the provided information of the communication specifications, the predetermined communication with the image capturing apparatus in accordance with the predetermined standard.

23. A non-transitory computer-readable storage medium that stores a program for causing, when executed by a computer included in an image capturing apparatus that comprises a mounting structure, in which a device capable of holding at least an image captured by the image capturing apparatus is capable of being mounted and via which the image capturing apparatus is capable of communicating with the mounted device in accordance with a predetermined standard, the computer to:

obtain, from the device, information of communication specifications indicative of a command having a form compliant with the predetermined standard and defined as a new command, which is not defined in the predetermined standard supported by the image capturing apparatus, for performing predetermined communication with the device mounted in the mounting structure, wherein the information of communication specifications is defined by the new command for which a wait time after issuance of a predetermined command is changed; and perform, using the obtained information of the communication specifications, the predetermined communication with the device mounted in the mounting structure in accordance with the predetermined standard.

24. A non-transitory computer-readable storage medium that stores a program for causing, when executed by a computer included in a device mounted in a mounting structure of an image capturing apparatus including the mounting structure, a device capable of holding at least an image captured by the image capturing apparatus being capable of being mounted in the mounting structure and the image capturing apparatus being capable of communicating with the mounted device via the mounting structure in accordance with a predetermined standard, the computer to:

provide, to the image capturing apparatus, information of communication specifications indicative of a command having a form compliant with the predetermined standard and defined as a new command, which is not defined in the predetermined standard supported by the image capturing apparatus, for performing predetermined communication with the image capturing apparatus, wherein the information of communication specifications is defined by the new command for which at least a wait time after issuance of a predetermined command is changed; and perform, using the provided information of the communication specifications, the predetermined communication with the image capturing apparatus in accordance with the predetermined standard.

* * * * *